(12) United States Patent
Fujiune et al.

(10) Patent No.: US 7,190,650 B2
(45) Date of Patent: Mar. 13, 2007

(54) OPTICAL DISC DRIVE FOR IDENTIFYING AND PROCESSING MULTIPLE OPTICAL DISC TYPES

(75) Inventors: Kenji Fujiune, Takatsuki (JP); Takashi Kishimoto, Nara (JP); Katsuya Watanabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 551 days.

(21) Appl. No.: 10/648,018

(22) Filed: Aug. 26, 2003

(65) Prior Publication Data

US 2004/0037197 A1 Feb. 26, 2004

(30) Foreign Application Priority Data

Aug. 26, 2002 (JP) ............................. 2002-244700

(51) Int. Cl.
*G11B 7/00* (2006.01)
(52) U.S. Cl. .................... 369/53.22; 369/53.2
(58) Field of Classification Search ..................... None
See application file for complete search history.

(56) References Cited

U.S. PATENT DOCUMENTS 5,831,952 A 11/1998 Yamada et al.
6,061,318 A * 5/2000 Hwang ..................... 369/53.23

FOREIGN PATENT DOCUMENTS

| EP | 0725295 A1 | 8/1996 |
| EP | 1211676 A1 | 6/2002 |
| JP | 52-080802 | 7/1977 |
| JP | 05-054406 A | 3/1993 |
| JP | 09-115231 A | 5/1997 |
| JP | 10-055602 A | 2/1998 |

* cited by examiner

*Primary Examiner*—William Korzuch
*Assistant Examiner*—Adam R. Giesy
(74) *Attorney, Agent, or Firm*—Akin Gump Strauss Hauer & Feld, LLP

(57) ABSTRACT

An optical disc drive for processing multiple types of optical discs, of which information storage layers have different depths, includes: a light source; a lens for forming a beam spot; a photodetector for outputting a reflected light signal; a spherical aberration generator for generating a minimum spherical aberration when the beam spot is at a reference depth; a focus drive signal generator for moving the beam spot perpendicularly to the information storage layer of a loaded disc by controlling a position of the lens; a light quantity detector for generating a light quantity signal on receiving a reflected light signal every time the beam spot is moved; and a type recognizer for recognizing the type of the loaded disc by estimating the depth of the information storage layer according to a degree of symmetry of the waveform of the light quantity signal.

19 Claims, 16 Drawing Sheets

PRIOR ART
*FIG.1*
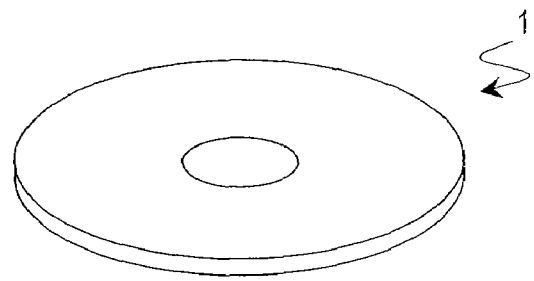
PRIOR ART
*FIG.2A*
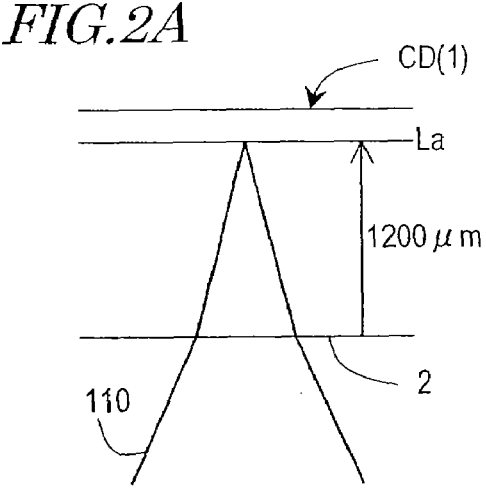
PRIOR ART
*FIG.2B*
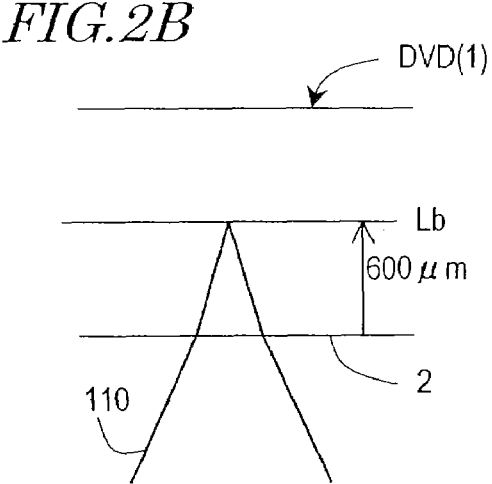
PRIOR ART
*FIG.2C*
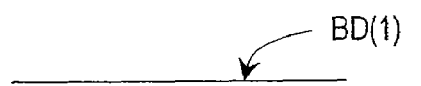
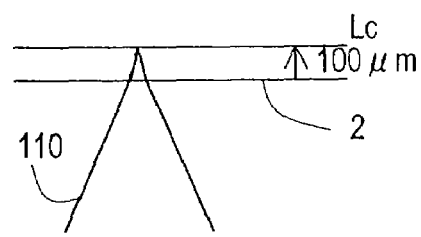

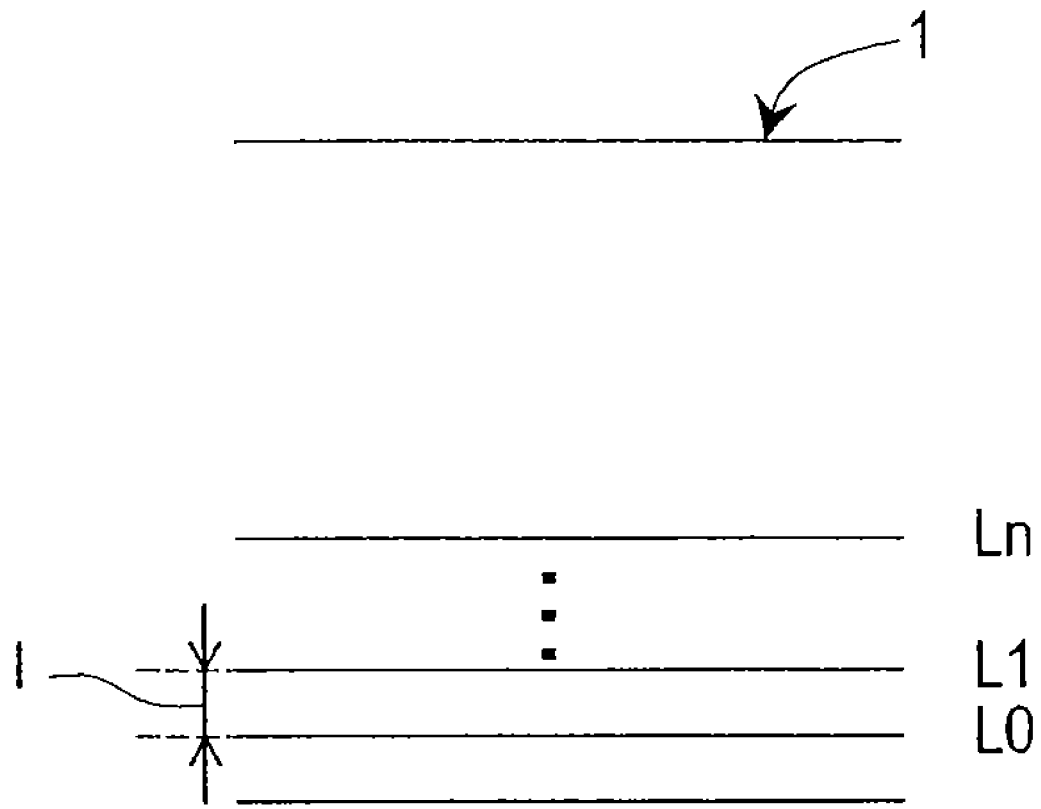

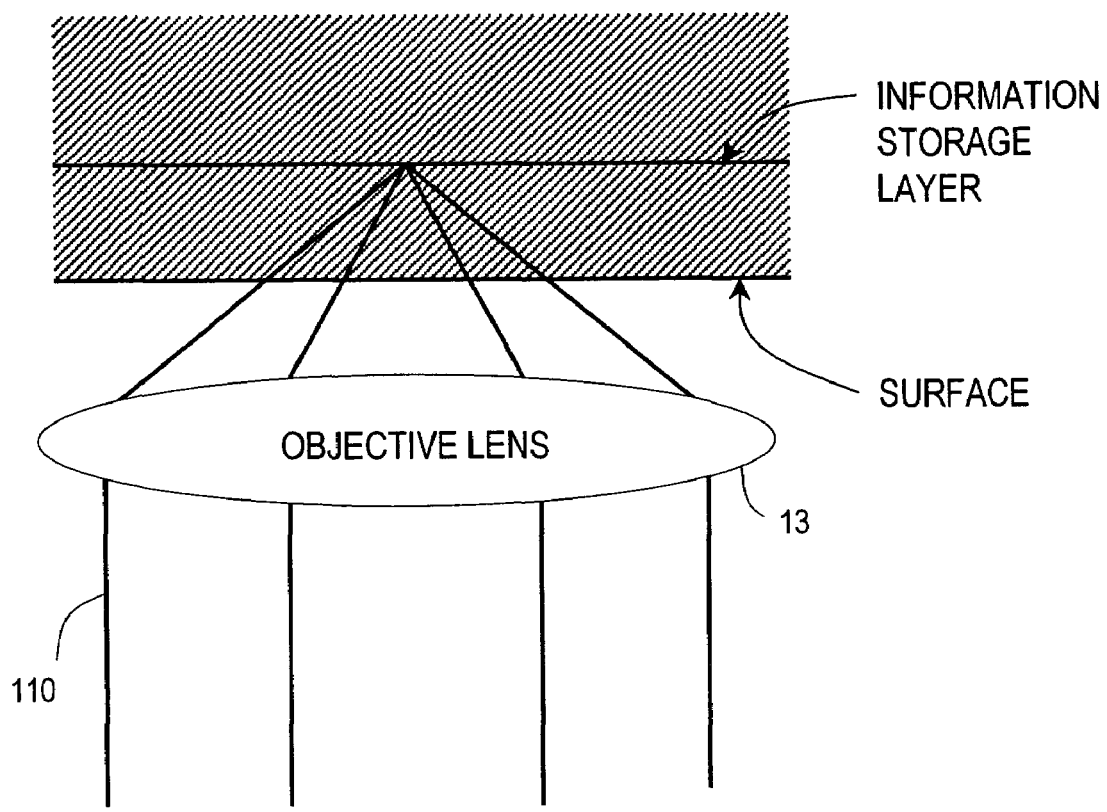

FIG. 7
(a) FE SIGNAL
(b) REFLECTED LIGHT QUANTITY SIGNAL
(c) SYMMETRY INDICATING SIGNAL
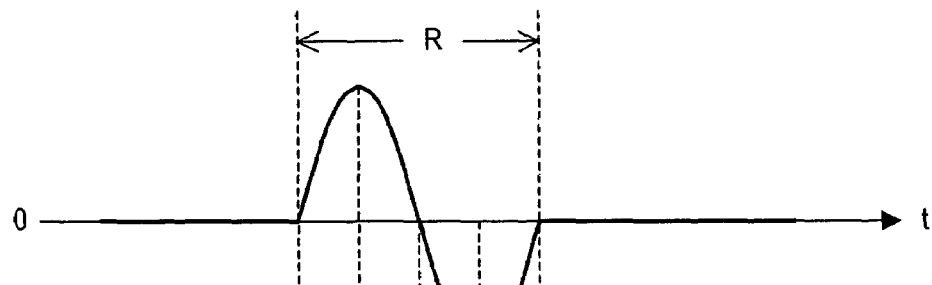
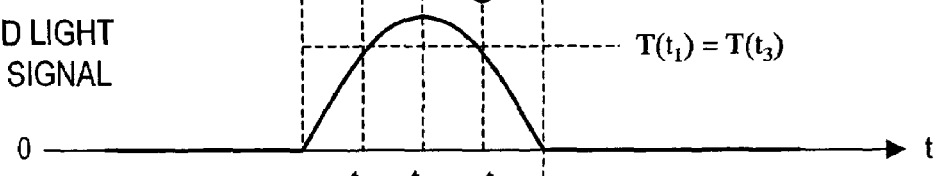
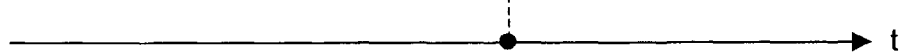
FIG. 8
(a) FE SIGNAL
(b) REFLECTED LIGHT QUANTITY SIGNAL
(c) SYMMETRY INDICATING SIGNAL
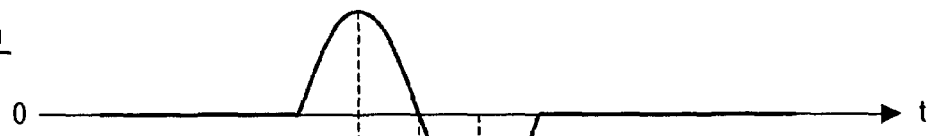
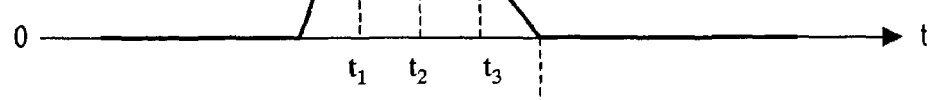
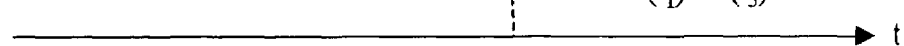

OPTICAL DISC DRIVE FOR IDENTIFYING AND PROCESSING MULTIPLE OPTICAL DISC TYPES

BACKGROUND OF THE INVENTION

1. Field of the Invention

The present invention relates to a technique of recognizing the type of an optical disc that has been loaded into an optical disc drive, which is compatible with multiple types of optical discs including compact discs (CDs), digital versatile discs (DVDs) and Blu-ray discs (BDs). The present invention also relates to a technique of focusing a light beam on a desired one of multiple information storage layers of an optical disc and optimizing the spherical aberration thereof.

2. Description of the Related Art

In reading data from an optical disc, the conventional optical disc drive irradiates the optical disc with relatively weak light having a constant quantity and detects the light that has been reflected from the optical disc. For example, the optical disc drive disclosed in Japanese Laid-Open Publication No. 52-80802 irradiates an optical disc, including pits and spaces with mutually different physical properties, with light. In this case, when reflected from the optical disc, the light has its intensity modulated by those pits and spaces. Thus, the data can be read from the optical disc by way of the reflected light. On the other hand, in writing data on the optical disc, the optical disc drive adaptively changes the quantity of light according to the data to be written and then irradiates a material film (i.e., an information storage layer) on the optical disc with such light in variable quantities. As a result, marks and spaces, representing the data, are formed on the optical disc.

On a read-only optical disc, pits and spaces are arranged spirally. On the other hand, on an optical disc from/on which data can be read and written, an information storage layer is deposited by an evaporation process, for example, over spiral grooves and tracks (i.e., areas between the grooves). In this case, data is read from, and written onto, the information storage layer by an optical technique.

To read or write information from/on an optical disc, a focus control and a tracking control are needed. The "focus control" means controlling a focal point, that is, a beam spot of a light beam perpendicularly to the surface of a given optical disc (which direction will be referred to herein as a "focusing direction") such that the light beam can always maintain a predetermined focusing state on the recording material film. To control the beam spot of a light beam with respect to a predetermined information storage layer will be referred to herein as a "focus control on a predetermined information storage layer". On the other hand, the "tracking control" means controlling the beam spot of a light beam along the radius of a given optical disc (which direction will be referred to herein as a "tracking direction") such that the beam spot is always located right on a target track.

Hereinafter, a conventional optical disc drive will be described with reference to FIG. 14, which shows an arrangement of functional blocks for a conventional optical disc drive 510. As shown in FIG. 14, the optical disc drive 510 includes a semiconductor laser diode 11 and an objective lens 13 (which together function as emitting/focusing means), a focus actuator 14 (which functions as focus moving means), an FE generator 20 (which functions as focus error detecting means) and a focus drive signal generator 22 (which functions as a focus driving means or a focus driver).

More specifically, an optical head 10 is made up of the semiconductor laser diode 11, the objective lens 13, a beam splitter 12, the focus actuator 14, and a photodetector 15. A light beam, which has been emitted from the semiconductor laser diode 11, is passed through the beam splitter 12 and then focused onto the optical disc 1 through the objective lens 13. After having been reflected from the optical disc 1, the light beam is passed through the objective lens 13 again, reflected from the beam splitter 12 and then incident onto the photodetector 15. The objective lens 13 is supported by an elastic body (not shown). When a predetermined amount of current flows through the focus actuator 14, the objective lens 13 is moved in the focusing direction due to an electromagnetic force. In this manner, the beam spot of the light beam can be changed. On detecting the incident light beam, the photodetector 15 outputs a signal, representing the detected light, to the FE generator 20.

Based on the signal supplied from the photodetector 15, the FE generator 20 obtains a signal representing the focusing state of the light beam with respect to the information storage layer of the optical disc 1 (i.e., a focus error signal representing the deviation of the beam spot of the light beam from the information storage layer of the optical disc 1) and outputs the focus error signal to a disc type recognizer 43. The focus drive signal generator 22 generates a drive signal and outputs it to the focus actuator 14. In response to the drive signal, the focus actuator 14 moves the objective lens 13 either toward, or away from, the optical disc 1. This drive signal is also supplied to the disc type recognizer 43.

Next, it will be described with reference to FIG. 15 how this optical disc drive 510 performs a disc type recognition operation. In FIG. 15, portion (a) shows the waveform of the output signal of the focus drive signal generator 22, while portion (b) shows the waveform of the output signal of the FE generator 20. In FIG. 15, the abscissa represents the time and the ordinate represents the signal level.

The focus drive signal generator 22 starts moving the beam spot of the light beam from a position, which is sufficiently away from the optical disc 1, toward the optical disc 1. When the beam spot of the light beam reaches the information storage layer of the optical disc 1, the output signal of the FE generator 20 has a zero level as indicated by the legend "location of information storage layer" in FIG. 15B. This is a so-called "zero cross state". When the output signal of the FE generator 20 is in the zero cross state, the disc type recognizer 43 detects the depth of the information storage layer of the optical disc 1 based on the level of the output signal of the focus drive signal generator 22. In this case, the distance from the home position of the focus actuator 14 to the surface of the optical disc 1 is constant, and the distance for which the focus actuator 14 can move in response to the output signal of the focus drive signal generator 22 is also constant. Thus, the depth of the information storage layer of the optical disc 1 can be detected easily. The depth of the information storage layer of one type of optical disc as measured from the surface thereof is different from that of the information storage layer of another type of optical disc. Accordingly, the optical disc drive 510 can recognize the type of the given optical disc 1 according to the depth detected.

Next, another conventional optical disc drive will be described with reference to FIG. 16, which shows an arrangement of functional blocks for the conventional optical disc drive 520. When an optical disc 1 including multiple information storage layers is loaded into this optical disc drive 520, the optical disc drive 520 performs a focus control on a desired one of the information storage layers of the optical disc 1 such that the beam spot of the light beam is located right on the desired information storage layer. In FIG. 16, each component of the optical disc drive 520, having substantially the same function as the counterpart of the optical disc drive 510 shown in FIG. 14, is identified by the same reference numeral and the description thereof will be omitted herein.

In this optical disc drive 520, the output signal of the FE generator 20 is supplied to a focus filter 21 and a selector 45. In response to the output signal of the FE generator 20, the focus filter 21 compensates for the phase for the purpose of a focus control. Then, the focus filter 21 outputs the phase-compensated signal to the selector 45. The selector 45 selects either the output signal of the focus drive signal generator 22 or the output signal of the focus filter 21 and then supplies the selected signal to the focus actuator 14.

Next, it will be described how the optical disc drive 520 performs a focus control process. While the optical disc drive 520 is performing no focus control (i.e., while the focus control is OFF), the selector 45 selects the output signal of the focus drive signal generator 22 and then passes it to the focus actuator 14. In response, the focus actuator 14 brings the beam spot of the light beam from a position that is sufficiently distant from the optical disc 1 closer to the optical disc 1. When the beam spot of the light beam reaches the information storage layer of the optical disc 1, the output signal of the FE generator 20 has a zero level as indicated by the legend "location of information storage layer" in FIG. 15B. At this zero-cross timing of the output signal of the FE generator 20, the selector 45 switches the signals to be output selectively to start passing the output signal of the focus filter 21 to the focus actuator 14. As a result, the beam spot of the light beam is controlled with respect to the information storage layer of the optical disc 1. In this case, the information storage layer to be subjected to the focus control is closest to the surface of the optical disc on which the light beam is incident. Conversely, if the focus actuator 14 separates the beam spot of the light beam away from the position that is sufficiently close to the optical disc 1, then the information storage layer to be subjected to the focus control is most distant from the surface of the optical disc 1 on which the light beam is incident. In this case, the focus control on that information storage layer is also started as described above.

Next, still another conventional optical disc drive will be described with reference to FIG. 17, which shows an arrangement of functional blocks for the conventional optical disc drive 530. The optical disc drive 530 can regulate the spherical aberration according to which information storage layer the light beam should be focused on. For that purpose, the optical disc drive 530 includes an aberration generator 16 and an aberration setter 30 as a spherical aberration generating means and an aberration regulator 32 as a spherical aberration regulating means. In FIG. 17, each component of the optical disc drive 530, having substantially the same function as the counterpart of the optical disc drive 510 or 520 shown in FIG. 14 or 16, is identified by the same reference numeral and the description thereof will be omitted herein.

In this optical disc drive 530, the output signal of the photodetector 15 is supplied to the FE generator 20 and a TE generator 24. The focus error signal, i.e., output signal of the FE generator 20, is supplied to the focus filter 21, subjected to predetermined processing there, and then passed to the focus actuator 14. Meanwhile, in accordance with the output signal of the photodetector 15, the TE generator 24 generates a tracking error signal TE, representing a positional relationship between the beam spot and a target track on the optical disc 1, and supplies it to an amplitude detector 25. In response, the amplitude detector 25 detects the amplitude of the tracking error signal TE that has been supplied from the TE generator 24 and passes the result to the aberration regulator 32.

The aberration regulator 32 not only stores the signal supplied from the amplitude detector 25 but also generates a setting signal from it and supplies the setting signal to the aberration setter 30. On receiving the output signal of the aberration regulator 32, the aberration setter 30 outputs an aberration setting signal, which defines the spherical aberration to be generated at the beam spot of the light beam, to the aberration generator 16. In accordance with the aberration setting signal, the aberration generator 16 changes the spherical aberration of the light beam. As a result, the tracking error signal generated by the TE generator 24 is changed and output to the amplitude detector 25 again. This feedback process is carried out so as to change the spherical aberration within a predetermined range. The aberration regulator 32 draws up and stores thereon a table of correspondence showing the relationship between the output signal of the amplitude detector 25 and the magnitude of spherical aberration generated. Then, the aberration regulator 32 finds a setting signal, which defines a spherical aberration that is associated with the output signal of the amplitude detector 25 with the maximum signal level, and outputs that setting signal to the aberration setter 30.

Next, it will be described with reference to FIG. 18 how the optical disc drive 530 regulates the spherical aberration. In FIG. 18, portion (a) shows the waveform of the setting signal being output from the aberration regulator 32, while portion (b) shows the waveform of the output signal of the amplitude detector 25. In FIG. 18, the abscissa represents the time and the ordinate represents the signal level.

As shown in portion (a) of FIG. 18, the aberration regulator 32 outputs a ramp signal with a predetermined amplitude to the aberration setter 30 before the time $t_0$. The tracking error signal to be generated in accordance with such a setting signal has the maximum amplitude when the spherical aberration at the beam spot of the light beam is minimized. However, as the spherical aberration increases, the amplitude of the tracking error signal decreases. Accordingly, a setting signal that is associated with the output signal of the amplitude detector 25 with the maximum level as shown in portion (b) of FIG. 18 should define the best spherical aberration. Thus, the aberration regulator 32 stores the level of the setting signal that is associated with the output signal of the amplitude detector 25 with the maximum level, and starts outputting the stored setting signal to the aberration setter 30 at the time $t_0$. As a result, the tracking error signal will maintain the maximum amplitude and the output signal of the amplitude detector 25 will also keep the maximum amplitude from the time $t_0$ on as shown in portion (b) of FIG. 18. In this manner, the spherical aberration at the beam spot of the light beam can be regulated to the best value.

The conventional optical disc drives 510, 520 and 530, however, have the following drawbacks.

First, in the conventional optical disc drive 510 shown in FIG. 14, the depth of the information storage layer of the given optical disc 1 may not be detected so accurately due to possible variations in the sensitivity of the focus actuator 14 or other circuits. Also, since the optical disc 1 should flutter due to its own rotation and due to vibrations caused by the driving mechanism of the optical disc drive, the information storage layer is constantly movable vertically, thus potentially causing errors in the detected depth of the information storage layer. If such an error is a serious one, then the type of the loaded disc may be recognized erroneously.

On the other hand, if the optical disc 1 to be loaded has three or more information storage layers, the conventional optical disc drive 520 shown in FIG. 16 cannot perform any focus control on the intermediate information storage layer (s). Also, if the optical disc drive 520 attempts to perform a focus control on the information storage layer that is most distant from the surface of the optical disc 1 on which the light beam is incident, the objective lens 13 may happen to contact with the optical disc 1. This is because the beam spot of the light beam needs to be initially located deeper than the information storage layer at the beginning of a focus control. Thus, while the focus control is being carried out on that deep information storage layer, the objective lens 13 is too much close to the optical disc 1.

Furthermore, in the conventional optical disc drive 530 shown in FIG. 17, the focus error signal generated by the FE generator 20, as well as the tracking error signal generated by the TE generator 24, may decrease its amplitude as the spherical aberration increases. Thus, the focus control cannot be carried out stably. This is because the spherical aberration at the beam spot of the light beam is still far from its best value for a while after the focus control operation has been started. Then, even if a tracking control operation is started in order to generate the tracking error signal, it is difficult to measure the amplitude of the tracking error signal. As a result, it is also hard to regulate the spherical aberration to its best value.

SUMMARY OF THE INVENTION

In order to overcome the problems described above, an object of the present invention is to accurately recognize the type of an optical disc that has been loaded into an optical disc drive, compatible with multiple types of optical discs, by detecting the depth of the information storage layer thereof precisely.

Another object of the present invention is to get a precise focus control started on a desired one of multiple information storage layers of an optical disc.

Still another object of the present invention is to regulate the spherical aberration constantly.

An optical disc drive according to a preferred embodiment of the present invention is preferably used to read and/or write information from/on multiple types of optical discs, of which the information storage layers have mutually different depths as measured from the surface thereof. The optical disc drive preferably includes a light source, a lens, a photodetector, a spherical aberration generator, a focus driver, a light quantity detector, and a type recognizer. The light source preferably emits light. The lens preferably converges the light to form a beam spot. The photodetector preferably detects the light that has been reflected from the information storage layer and preferably outputs a reflected light signal. The spherical aberration generator preferably generates a minimum spherical aberration when the beam spot is located at a reference depth that is defined by the depths of the information storage layers of the multiple types of optical discs. The focus driver preferably moves the beam spot perpendicularly to the information storage layer of one of the optical discs, which has been loaded into the optical disc drive, by controlling the position of the lens. The light quantity detector preferably generates a light quantity signal, representing the quantity of the reflected light, on receiving the reflected light signal from the photodetector every time the beam spot is moved. And the type recognizer preferably recognizes the type of the loaded optical disc by estimating the depth of the information storage layer of the optical disc from the surface thereof according to a degree of symmetry of the waveform of the light quantity signal.

In one preferred embodiment of the present invention, the optical disc drive preferably further includes a symmetry detector for outputting a symmetry indicating signal, representing the degree of symmetry of the waveform of the light quantity signal, by determining whether the waveform of the light quantity signal is symmetric or asymmetric in a predetermined period. In that case, the type recognizer preferably recognizes the type of the loaded optical disc in accordance with the symmetry indicating signal.

In this particular preferred embodiment, the optical disc drive preferably further includes a focus signal generator for generating a focus signal representing a positional relationship between the beam spot and the information storage layer. In that case, the symmetry detector preferably finds a first time, at which the focus signal has the highest level during the predetermined period, and a second time, at which the focus signal has the lowest level during the predetermined period, and preferably determines, by first and second levels of the light quantity signal at the first and second times, respectively, whether the waveform of the light quantity signal is symmetric or asymmetric.

More particularly, the symmetry detector preferably regards the waveform of the light quantity signal as symmetric if the difference between the first and second levels of the light quantity signal at the first and second times is equal to zero, and as asymmetric if the difference is not equal to zero.

In a specific preferred embodiment, the symmetry indicating signal generated by the symmetry detector preferably represents that the difference is zero, positive or negative, and the type recognizer preferably determines, according to the symmetry indicating signal, whether the depth of the information storage layer of the loaded optical disc from the surface thereof is greater or smaller than the reference depth.

In another preferred embodiment, the reference depth preferably falls within a range that is defined by the depths of the information storage layers of first and second ones of the multiple types of optical discs.

In still another preferred embodiment, the type recognizer preferably determines the number of information storage layers of the loaded optical disc according to the waveform of the light quantity signal.

In yet another preferred embodiment, the optical disc drive preferably further includes an aberration setter for generating an aberration setting signal that defines how much spherical aberration should be generated. The spherical aberration generator preferably generates the spherical aberration in accordance with the aberration setting signal. The type recognizer preferably estimates the depth of the information storage layer of the loaded optical disc from the surface thereof in accordance with the aberration setting signal.

An optical disc drive according to another preferred embodiment of the present invention is preferably used to read and/or write information from/on an optical disc including multiple information storage layers that have mutually different depths as measured from the surface thereof. The optical disc drive preferably includes a light source, a lens, a photodetector, a spherical aberration generator, a focus driver, a light quantity detector, and a layer number finder. The light source preferably emits light. The lens preferably converges the light to form a beam spot. The photodetector preferably detects the light that has been reflected from the information storage layer and preferably outputs a reflected light signal. The spherical aberration generator preferably generates a minimum spherical aberration when the beam spot is located at a reference depth that is defined by the depths of the information storage layers of the optical disc. The focus driver preferably moves the beam spot perpendicularly to the information storage layers by controlling the position of the lens. The light quantity detector preferably generates a light quantity signal, representing the quantity of the reflected light, on receiving the reflected light signal from the photodetector every time the beam spot is moved. And the layer number finder preferably finds the layer number of the information storage layer, on which the beam spot should be located, by the waveform of the light quantity signal. The information storage layers are preferably numbered in an ascending order from the surface of the optical disc.

In one preferred embodiment of the present invention, the optical disc drive preferably further includes a selector and a focus signal generator. The selector preferably selects one of the information storage layers by the layer number that has been found by the layer number finder and preferably moves the beam spot toward the vicinity of the selected information storage layer by driving the focus driver. The focus signal generator preferably generates a focus signal representing a positional relationship between the beam spot and the selected information storage layer.

In this particular preferred embodiment, the selected information storage layer is preferably changeable in accordance with an instruction of the selector.

In another preferred embodiment, the optical disc drive preferably further includes a symmetry detector for outputting a symmetry indicating signal, representing the degree of symmetry of the waveform of the light quantity signal, by determining whether the waveform of the light quantity signal is symmetric or asymmetric in a predetermined. In that case, the layer number finder preferably finds the layer number of the selected information storage layer of the optical disc in accordance with the symmetry indicating signal.

In this particular preferred embodiment, the symmetry detector preferably finds a first time, at which the focus signal has the highest level during the predetermined period, and a second time, at which the focus signal has the lowest level during the predetermined period, and preferably determines, by first and second levels of the light quantity signal at the first and second times, respectively, whether the waveform of the light quantity signal is symmetric or asymmetric.

An optical disc drive according to still another preferred embodiment of the present invention is preferably used to read and/or write information from/on an optical disc that includes an information storage layer. The optical disc drive preferably includes a light source, a lens, a photodetector, a spherical aberration generator, a focus driver, a light quantity detector, a symmetry detector, and an aberration regulator. The light source preferably emits light. The lens preferably converges the light to form a beam spot. The photodetector preferably detects the light that has been reflected from the information storage layer and preferably outputs a reflected light signal. The spherical aberration generator preferably generates a spherical aberration in response to a control signal. The focus driver preferably moves the beam spot back and forth between one side and the other side of the information storage layer and perpendicularly to the information storage layer by controlling the position of the lens. The light quantity detector preferably generates a light quantity signal, representing the quantity of the reflected light, on receiving the reflected light signal from the photodetector every time the beam spot is moved. The symmetry detector preferably outputs a symmetry indicating signal, representing the degree of symmetry of the waveform of the light quantity signal, by determining whether the waveform of the light quantity signal is symmetric or asymmetric. And the aberration regulator preferably generates and outputs the control signal to the spherical aberration generator in accordance with the symmetry indicating signal. The aberration regulator preferably identifies the symmetry indicating signal, representing that the waveform of the light quantity signal is symmetric, and preferably generates the control signal associated with the identified symmetry indicating signal.

In one preferred embodiment of the present invention, the optical disc drive preferably further includes a focus signal generator for generating a focus signal representing a positional relationship between the beam spot and the information storage layer. In that case, the symmetry detector preferably finds a first time, at which the focus signal has the highest level during a predetermined period, and a second time, at which the focus signal has the lowest level during the predetermined period, and preferably determines, by first and second levels of the light quantity signal at the first and second times, respectively, whether the waveform of the light quantity signal is symmetric or asymmetric during the predetermined period.

In an alternative preferred embodiment, the optical disc drive preferably further includes a focus signal generator for generating a focus signal representing a positional relationship between the beam spot and the information storage layer. In that case, the symmetry detector preferably finds a first time, at which the light quantity signal has the highest level during a predetermined period, and a second time, at which the light quantity signal has the lowest level during the predetermined period, and preferably determines, by first and second levels of the focus signal at the first and second times, respectively, whether the waveform of the light quantity signal is symmetric or asymmetric.

A disc type recognition method according to a preferred embodiment of the present invention is preferably a method for recognizing the type of a loaded optical disc as one of multiple types of optical discs, of which the information storage layers have mutually different depths as measured from the surface thereof. The method preferably includes the steps of: emitting light; getting the light converged, and a beam spot formed, by a lens; detecting the light that has been reflected from the information storage layer to generate a reflected light signal; generating a minimum spherical aberration when the beam spot is located at a reference depth that is defined by the depths of the information storage layers of the multiple types of optical discs; moving the beam spot perpendicularly to the information storage layer of the loaded optical disc by controlling the position of the lens; generating a light quantity signal, representing the quantity of the reflected light, on receiving the reflected light signal every time the beam spot is moved; and recognizing the type of the loaded optical disc by estimating the depth of the information storage layer of the optical disc from the surface thereof according to a degree of symmetry of the waveform of the light quantity signal.

A focus finding method according to a preferred embodiment of the present invention is preferably a method for finding the beam spot of light on one of multiple information storage layers of an optical disc. The information storage layers preferably have mutually different depths as measured from the surface of the optical disc. The method preferably includes the steps of: emitting light; getting the light converged, and a beam spot formed, by a lens; detecting the light that has been reflected from the information storage layer to generate a reflected light signal; minimizing the spherical aberration of the lens when the beam spot is located at a reference depth that is defined by the depths of the information storage layers of the optical disc; moving the beam spot perpendicularly to the information storage layers by controlling the position of the lens; generating a light quantity signal, representing the quantity of the reflected light, on receiving the reflected light signal every time the beam spot is moved; and finding the layer number of the information storage layer, on which the beam spot should be located, by the waveform of the light quantity signal. The information storage layers are preferably numbered in an ascending order from the surface of the optical disc.

A spherical aberration regulating method according to a preferred embodiment of the present invention is preferably a method for regulating a spherical aberration with respect to the information storage layer of an optical disc. The method preferably includes the steps of: emitting light; getting the light converged, and a beam spot formed, by a lens; detecting the light that has been reflected from the information storage layer to generate a reflected light signal; moving the beam spot back and forth between one side and the other side of the information storage layer and perpendicularly to the information storage layer by controlling the position of the lens; generating a light quantity signal, representing the quantity of the reflected light, on receiving the reflected light signal every time the beam spot is moved; outputting a symmetry indicating signal, representing the degree of symmetry of the waveform of the light quantity signal, by determining whether the waveform of the light quantity signal is symmetric or asymmetric; identifying the symmetry indicating signal, representing that the waveform of the light quantity signal is symmetric, and generating a control signal associated with the symmetry indicating signal identified; and generating the spherical aberration in accordance with the control signal.

A disc type recognition program product according to a preferred embodiment of the present invention is preferably a computer program product for use with an optical disc drive which recognizes a type of an optical disc, which has been loaded into the optical disc drive, as one of multiple types of optical discs, of which the information storage layers have mutually different depths as measured from the surface thereof. The program product preferably causes the optical disc drive to perform steps of: emitting light; getting the light converged, and a beam spot formed, by a lens; detecting the light that has been reflected from the information storage layer to generate a reflected light signal; generating a minimum spherical aberration when the beam spot is located at a reference depth that is defined by the depths of the information storage layers of the multiple types of optical discs; moving the beam spot perpendicularly to the information storage layer of the optical disc, loaded in the optical disc drive, by controlling the position of the lens; generating a light quantity signal, representing the quantity of the reflected light, on receiving the reflected light signal every time the beam spot is moved; and recognizing the type of the loaded optical disc by estimating the depth of the information storage layer of the optical disc from the surface thereof according to a degree of symmetry of the waveform of the light quantity signal.

A focus finding program product according to a preferred embodiment of the present invention is preferably a computer program product for use with an optical disc drive to cause which finds a beam spot of light on one of multiple information storage layers of an optical disc. The information storage layers preferably have mutually different depths as measured from the surface of the optical disc. The program product preferably causes the optical disc drive to perform steps of: emitting light; getting the light converged, and a beam spot formed, by a lens; detecting the light that has been reflected from the information storage layer to generate a reflected light signal; minimizing the spherical aberration of the lens when the beam spot is located at a reference depth that is defined by the depths of the information storage layers of the optical disc; moving the beam spot perpendicularly to the information storage layers by controlling the position of the lens; generating a light quantity signal, representing the quantity of the reflected light, on receiving the reflected light signal every time the beam spot is moved; and finding the layer number of the information storage layer, on which the beam spot should be located, by the waveform of the light quantity signal. The information storage layers are preferably numbered in an ascending order from the surface of the optical disc.

A spherical aberration regulating program product according to a preferred embodiment of the present invention is preferably a computer program product for use with an optical disc drive which regulates a spherical aberration with respect to an information storage layer of an optical disc. The program product preferably causes the optical disc drive to perform steps of: emitting light; getting the light converged, and a beam spot formed, by a lens; detecting the light that has been reflected from the information storage layer to generate a reflected light signal; moving the beam spot back and forth between one side and the other side of the information storage layer and perpendicularly to the information storage layer by controlling the position of the lens; generating a light quantity signal, representing the quantity of the reflected light, on receiving the reflected light signal every time the beam spot is moved; outputting a symmetry indicating signal, representing the degree of symmetry of the waveform of the light quantity signal, by determining whether the waveform of the light quantity signal is symmetric or asymmetric; identifying the symmetry indicating signal, representing that the waveform of the light quantity signal is symmetric, and generating a control signal associated with the symmetry indicating signal identified; and generating the spherical aberration in accordance with the control signal.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 1 is a perspective view schematically illustrating the appearance of an optical disc 1.

FIGS. 2A, 2B and 2C are cross-sectional views of a CD, a DVD-ROM and a BD, respectively, as exemplary optical discs 1 of mutually different types.

FIG. 3 is a cross-sectional view of an optical disc 1 including multiple information storage layers L0, L1, . . . , Ln.

FIG. 5 shows a focusing state in which no spherical aberration has been generated.

FIG. 7 shows the waveforms of signals in a situation where the depth of a target information storage layer is equal to the reference depth at which the best spherical aberration can be obtained.

FIG. 8 shows the waveforms of signals in a situation where the depth of a target information storage layer is deeper than the reference depth at which the best spherical aberration can be obtained.

Figure 12:
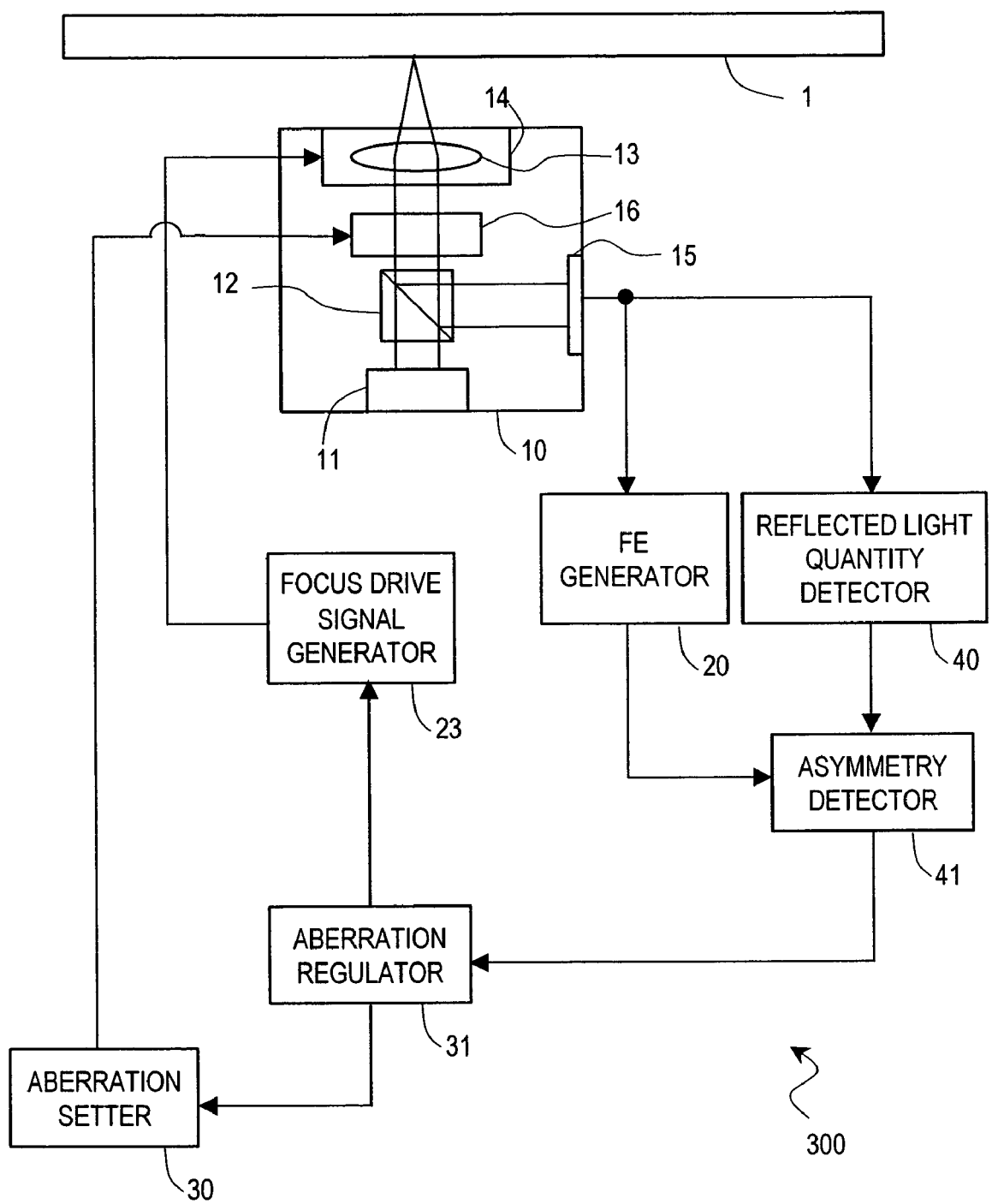
FIG. 12 shows an arrangement of functional blocks for an optical disc drive 300 according to a third specific preferred embodiment of the present invention.
Figure 13:
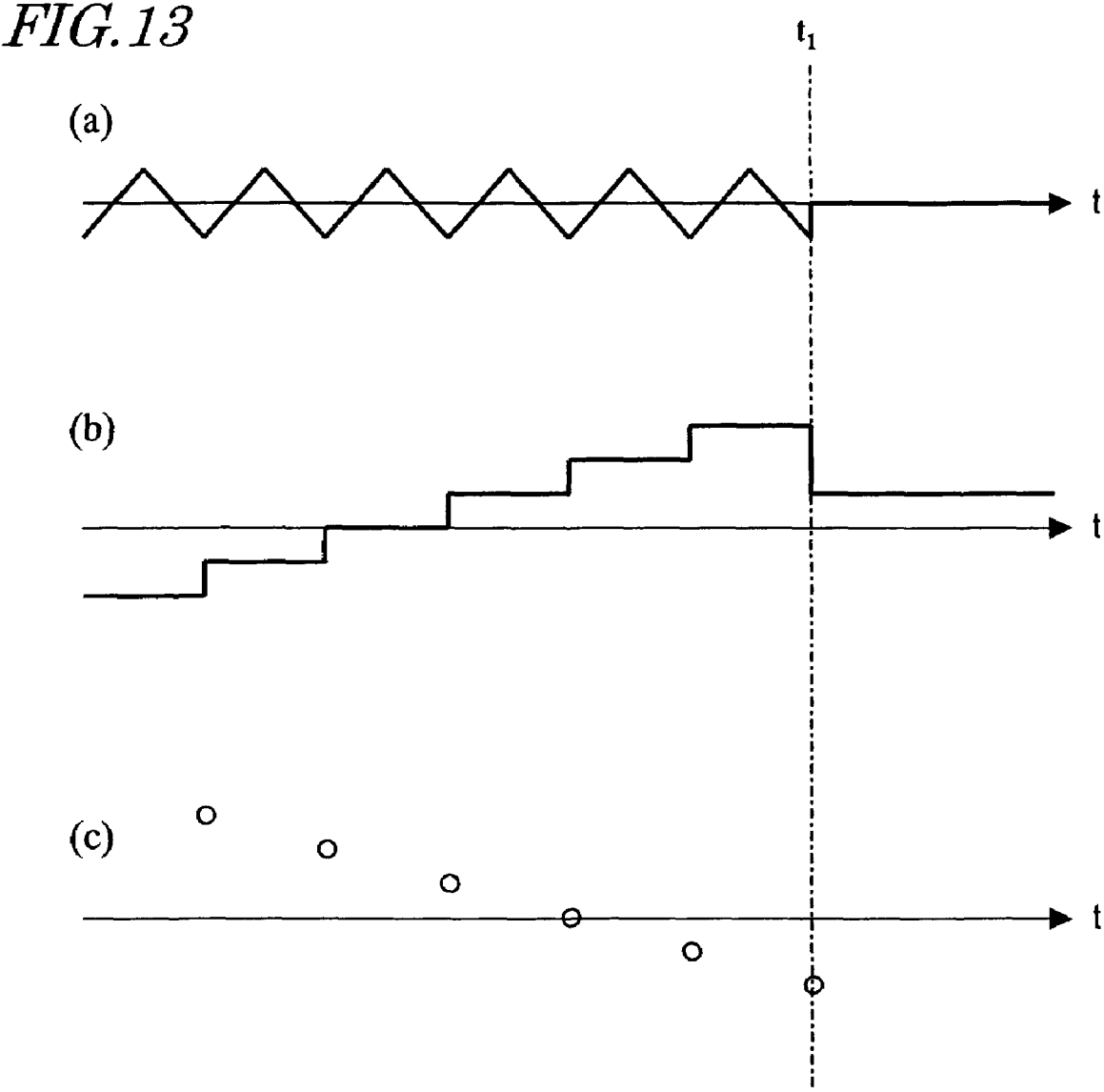

Portion (a) of FIG. 13 shows the output signal of the focus drive signal generator 23 shown in FIG. 12.

Portion (b) of FIG. 13 shows the signal output from the aberration regulator 31 to the aberration setter 30 shown in FIG. 12.

Portion (c) of FIG. 13 shows the symmetry indicating signal supplied from the asymmetry detector 41.

Figure 14:
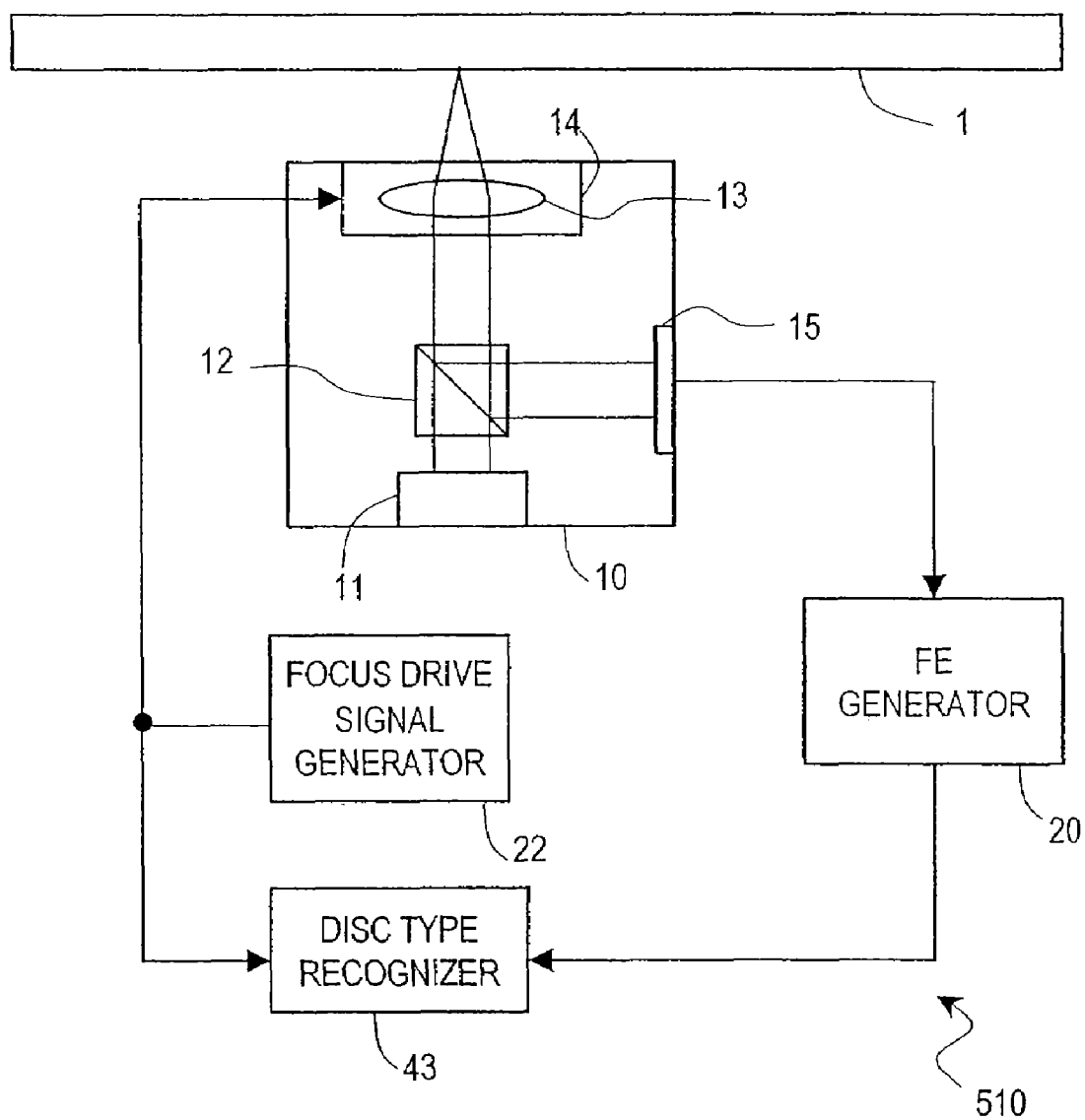

FIG. 14 shows an arrangement of functional blocks for a conventional optical disc drive 510.

Figure 15:
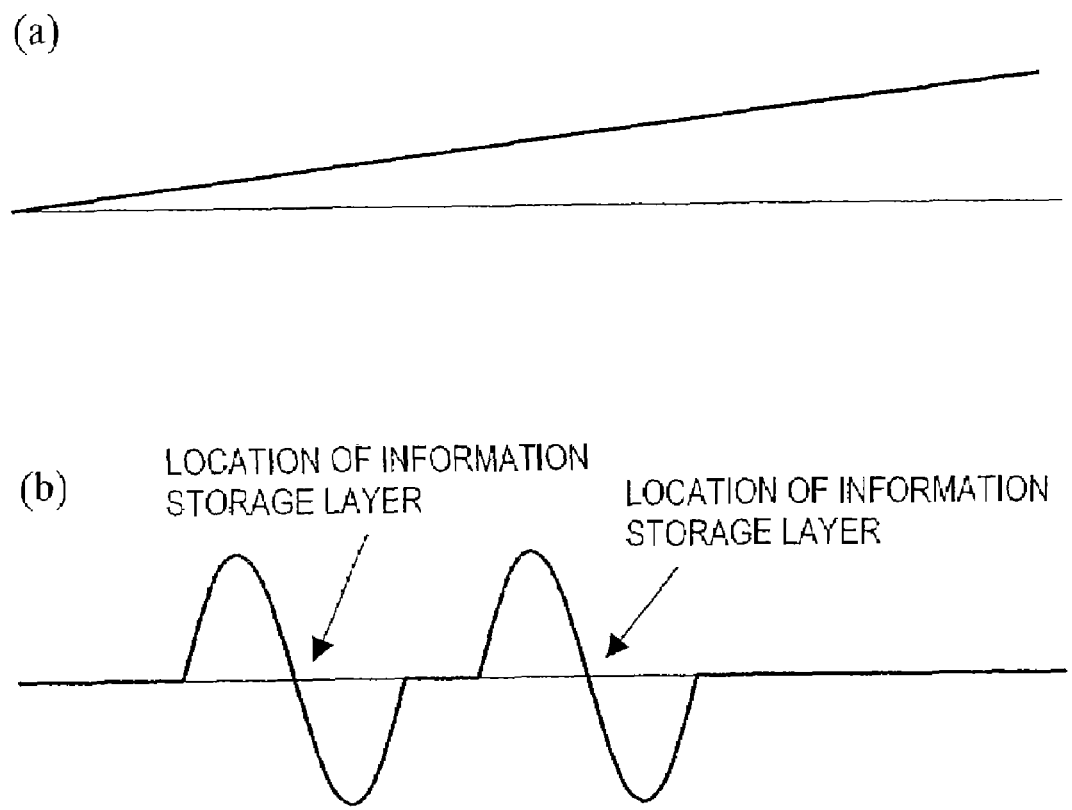

Portion (a) of FIG. 15 shows the waveform of the output signal of the focus drive signal generator 22 shown in FIG. 14.

Portion (b) of FIG. 15 shows the waveform of the output signal of the FE generator 20 shown in FIG. 14.

Figure 16:
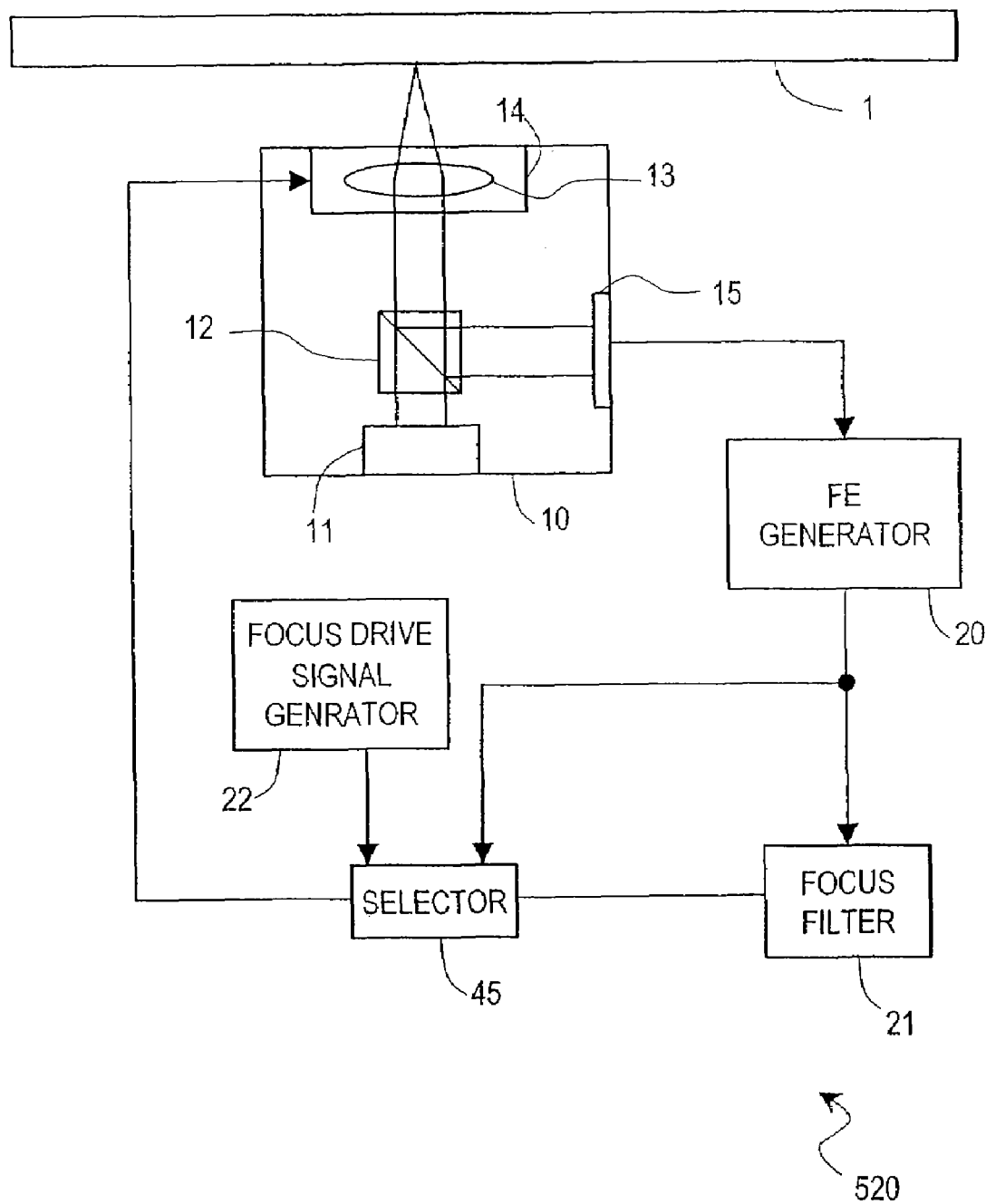

FIG. 16 shows an arrangement of functional blocks for another conventional optical disc drive 520.

Figure 17:
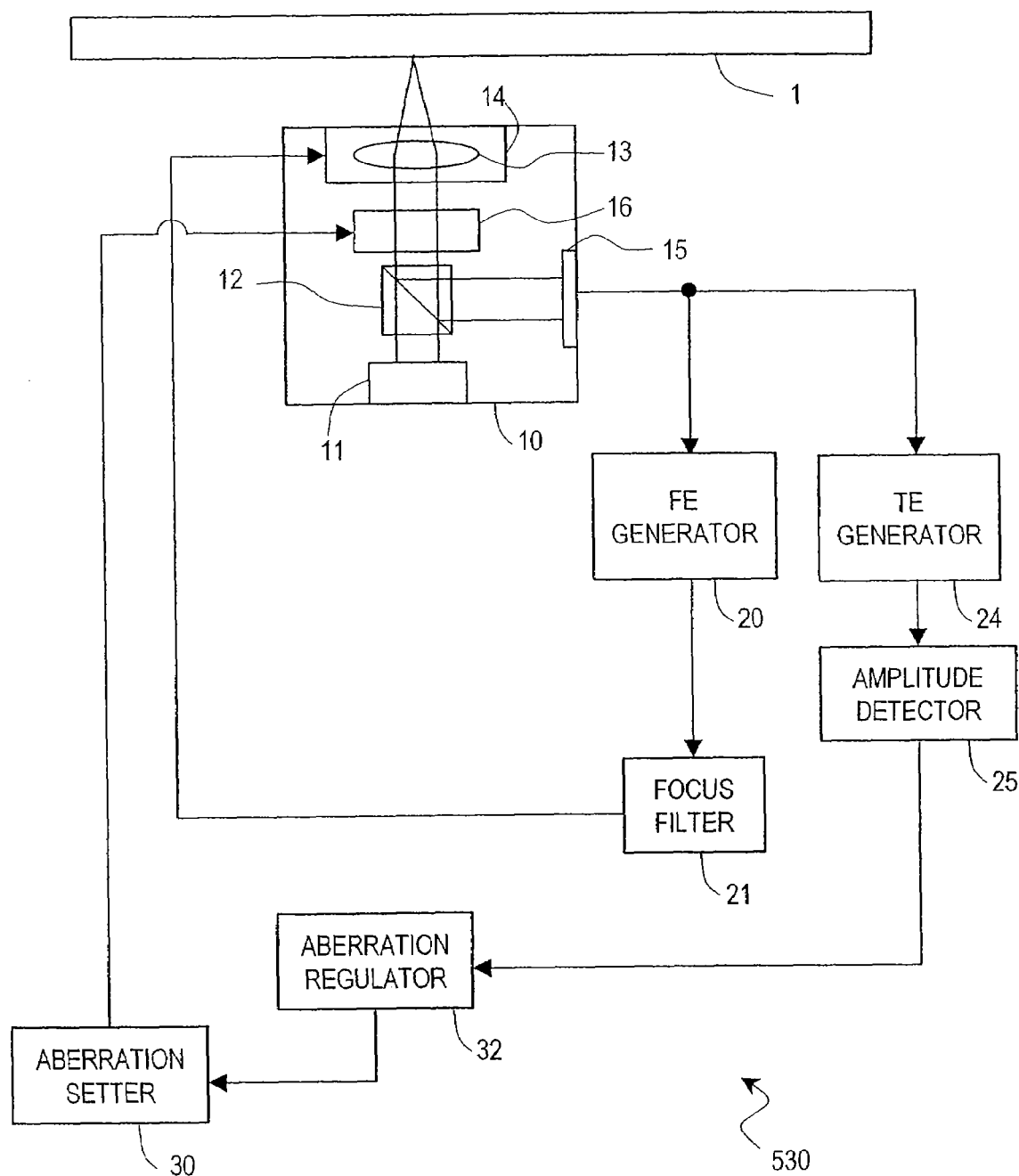

FIG. 17 shows an arrangement of functional blocks for still another conventional optical disc drive 530.

Figure 18:
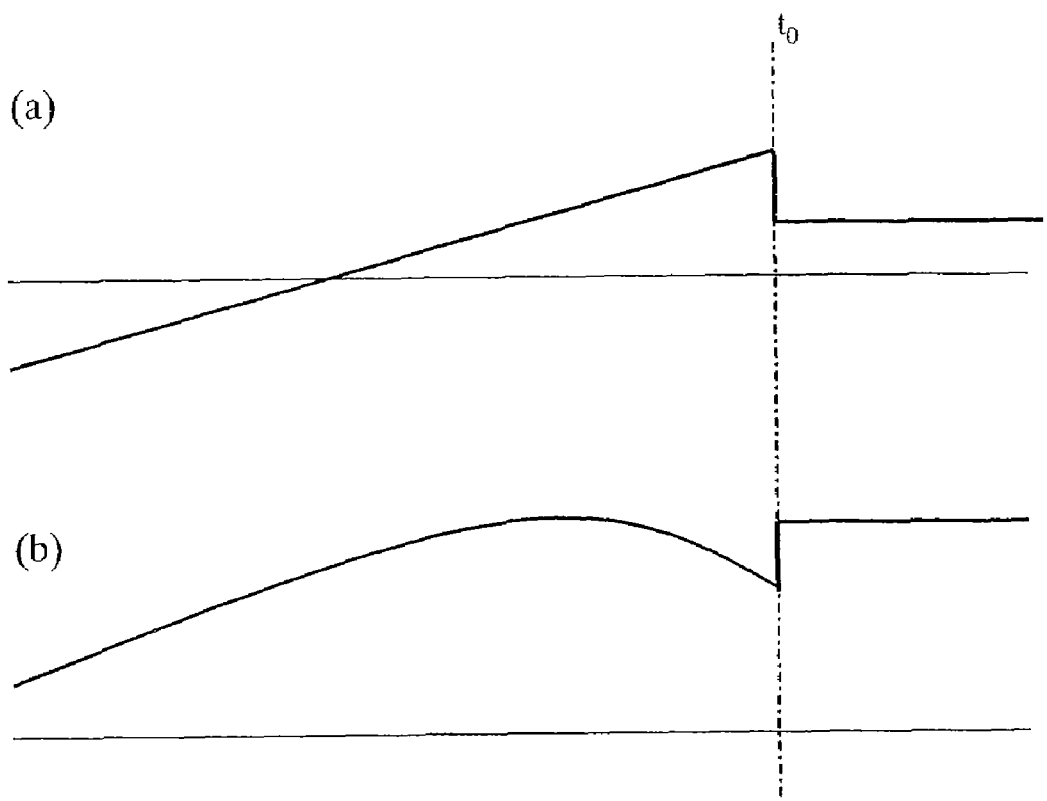

Portion (a) of FIG. 18 shows the waveform of the setting signal being output from the aberration regulator 32 shown in FIG. 17.

Portion (b) of FIG. 18 shows the waveform of the output signal of the amplitude detector 25 shown in FIG. 17.

DETAILED DESCRIPTION OF PREFERRED EMBODIMENTS

Hereinafter, preferred embodiments of the present invention will be described with reference to the accompanying drawings. It should be noted that components appearing in multiple different drawings but having substantially the same function or structure and performing almost the same operation will be identified by the same reference numeral. Before specific preferred embodiments of an optical disc drive according to the present invention are described in detail, an optical disc, from/on which information is read or written by the optical disc drive, will be described.

FIG. 1 illustrates the appearance of an optical disc 1. The optical disc 1 is a disk storage medium such as a CD, a DVD or a BD, from/on which the optical disc drive reads or writes information by exposing the disc 1 to a light beam (e.g., a laser beam) that comes from under one side of the disc 1. The information is written on a recording film, which is typically made of a phase-change-type material, for example. Thus, the recording film will be referred to herein as an "information storage layer". The information storage layer has a predetermined reflectance and reflects the light received thereon. The information storage layer may include a plurality of tracks (not shown) arranged spirally. Each of those tracks may be defined as a groove or a valley on the information storage layer.

Depending on the specific type of the optical disc 1, the information storage layer of the optical disc 1 is located at a different depth as measured from the surface thereof, on which the light beam is incident to read or write information from/on the optical disc. FIGS. 2A, 2B and 2C show cross sections of three different types of optical discs 1. Specifically, FIGS. 2A, 2B and 2C show a CD, a DVD and a BD, respectively. Each of these cross sections is taken on a plane that extends perpendicularly to the information storage layer of the optical disc 1. For reference purposes, a light beam 110, which enters the optical disc 1 through the surface 2 thereof and is focused on the information storage layer, is illustrated in each of FIGS. 2A, 2B and 2C. As shown in FIGS. 2A, 2B and 2C, the information storage layer La of the CD is located at a depth of about 1,200 μm, the information storage layer Lb of the DVD is located at a depth of about 600 μm, and the information storage layer Lc of the BD is located at a depth of about 100 μm as measured from the surface 2 thereof. The depth of the information storage layer corresponds with the thickness of a protective coating or a substrate that is provided to protect the information storage layer.

Also, even optical discs of the same type may have different numbers of information storage layers according to their intended storage capacities. For example, a BD may have one, two or four information storage layers. FIG. 3 shows a cross section of an optical disc 1 including multiple information storage layers L0, L1, . . . , Ln. These information storage layers may be provided at an interval I of about 25 μm, for example, so as to be located at mutually different depths as measured from the surface of the optical disc.

Hereinafter, specific preferred embodiments of an optical disc drive according to the present invention will be described.

Embodiment 1

Figure 4:
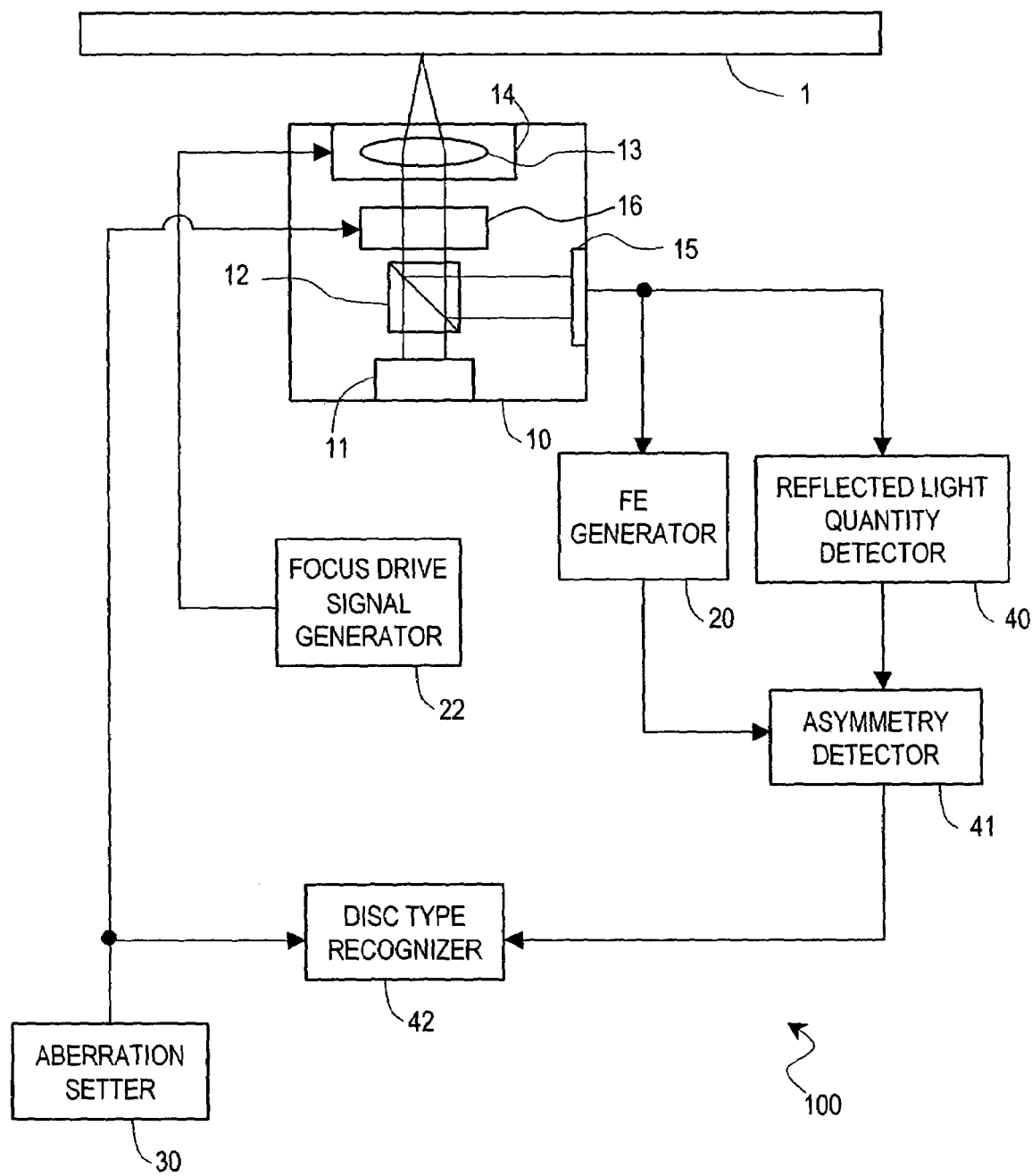
FIG. 4 shows an arrangement of functional blocks for an optical disc drive 100 according to a first specific preferred embodiment of the present invention.

FIG. 4 shows an arrangement of functional blocks for an optical disc drive 100 according to a first specific preferred embodiment of the present invention. The optical disc drive 100 can read and write information from/on any of multiple types of optical discs. However, the optical disc drive 100 does not have to have both of the read and write capabilities. Thus, the optical disc drive 100 may be used only for the purpose of reading information from one of those multiple types of optical discs.

When an optical disc 1 is loaded into this optical disc drive 100, the optical disc drive 100 quickly performs the process of recognizing the type of the optical disc 1 loaded. This is because the wavelength of the laser beam for use to read information from the optical disc 1 and the method of reading change with the specific type of the given optical disc 1. Also, the optical disc 1 has one of mutually different structures depending on its type. For example, as shown in FIGS. 2A, 2B and 2C, the depth of the information storage layer of the optical disc 1 changes according to the type of the optical disc 1.

Hereinafter, it will be described how the optical disc drive 100 performs the process of recognizing the type of the optical disc 1 loaded. In the following description, the number of information storage layers included in the optical disc 1 loaded is supposed to be one for convenience sake. However, if the optical disc 1 loaded has multiple information storage layers, the following statement will be applied to a particular information storage layer to be selected from those multiple layers.

As shown in FIG. 4, the optical disc drive 100 includes an optical head 10, a focus error signal (FE) generator 20, a focus drive signal generator 22, an aberration setter 30, a reflected light quantity detector 40, an asymmetry detector 41 and a disc type recognizer 42.

In response to an aberration setting signal that has been supplied from the focus drive signal generator 22 and aberration setter 30, the optical head 10 irradiates the optical disc 1 with a laser beam and detects the light that has been reflected from the optical disc 1, thereby outputting a detection signal. The optical head 10 includes a light source 11, a beam splitter 12, a lens 13, a focus actuator 14, a photodetector 15 and an aberration generator 16.

The light source 11 of the optical head 10 emits a laser beam having a wavelength that is associated with one of compatible optical discs 1. For example, if the optical disc drive 100 can read a CD, a DVD-ROM and a BD, then the light source 11 emits a red laser beam having a wavelength of about 750 nm for CDs, a red laser beam having a wavelength of about 650 nm for DVD-ROMs, or a violet laser beam having a wavelength of about 405 nm for BDs. The beam splitter 12 transmits the laser beam that has been emitted from the light source 11 but reflects the light that has been reflected from the optical disc 1 toward the photodetector 15. The lens 13 focuses the laser beam that has been emitted from the light source 11 onto the optical disc 1. The lens 13 is supported by an elastic body (not shown).

In response to a drive signal supplied from the focus drive signal generator 22, the focus actuator 14 controls the position of the lens 13, thereby moving the beam spot of the laser beam perpendicularly to the information storage layer of the optical disc 1 that has been loaded in the optical disc drive 100 (which direction will be referred to herein as a "focusing direction"). For example, when the drive signal is supplied to the focus actuator 14, a current in an amount corresponding to the level (or signal voltage value) of the drive signal will flow inside of the focus actuator 14 to generate electromagnetic force. As a result, the focus actuator 14 can change the position of the lens in the focusing direction according to the magnitude of the electromagnetic force generated.

The photodetector 15 transforms the received light (i.e., the light that has been reflected from the optical disc 1) into a signal representing the location and quantity of the received light and outputs such a signal. The aberration generator 16 generates a spherical aberration in response to the aberration setting signal. The "spherical aberration" means the magnitude of deviation between the beam spot of a light ray passing through an inside portion of the lens 13 and that of a light ray passing through an outside portion of the lens 13. The aberration generator 16 adjusts the path of the light 110 entering the lens 13 according to the level (i.e., signal voltage value) of the aberration setting signal, thereby regulating the magnitude of the spherical aberration generated. FIG. 5 shows a focusing state in which no spherical aberration has been generated. In such a state, the beam spot of the light ray passing through the inside portion of the lens 13 matches with that of the light ray passing through the outside portion of the lens 13, and therefore, the deviation is zero.

Referring back to FIG. 4, the configuration of the optical disc drive 100 will be described. The FE generator 20 generates a focus error (FE) signal, representing a positional relationship between the beam spot of the light beam on the optical disc 1 and the information storage layer, in accordance with the output signal of the photodetector 15. In this case, the positional relationship is defined in the focusing direction with respect to the optical disc 1. That is to say, the focus error signal represents the focusing state of the light beam with respect to the information storage layer of the optical disc 1. Thus, the focus error is synonymous with the deviation of the beam spot. According to the focus error signal, the beam spot can be located with respect to the information storage layer, i.e., whether the beam spot is located on the information storage layer, closer to the surface of the optical disc than the information storage layer is, or closer to the opposite surface of the optical disc than the information storage layer is.

The focus drive signal generator 22 generates a drive signal to be supplied to the focus actuator 14. In response to the drive signal, the focus actuator 14 either brings the objective lens 13 close to, or separates it from, the optical disc 1. For example, if the drive signal has a relatively high (voltage) level, then the focus actuator 14 may bring the lens 13 close to the optical disc 1. On the other hand, if the drive signal has a relatively low (voltage) level, then the focus actuator 14 may separate the lens 13 from the optical disc 1. The aberration setter 30 outputs an aberration setting signal for use to generate the spherical aberration.

Based on the output signal of the photodetector 15, the reflected light quantity detector 40 generates and outputs a light quantity signal representing the quantity of the reflected light. For example, the reflected light quantity detector 40 may obtain the sum of the output signals of the photodetector 15 and output it as the light quantity signal.

As described above, the output signal of the photodetector 15 is generated based on the light that has been reflected from the optical disc 1. Thus, there is close correlation between the depth of the beam spot in the optical disc 1 (specifically, the magnitude of the spherical aberration generated) and the light quantity signal output from the reflected light quantity detector 40. Hereinafter, such correlation will be described in detail with reference to FIG. 4 and FIG. 6A through 6J.

Figure 6A:
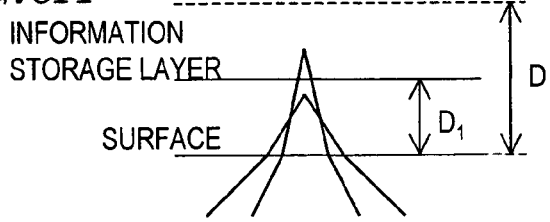
FIGS. 6A through 6J show how the relationship between the spherical aberration generated and the light quantity signal changes with the depth of the information storage layer as measured from the surface of the optical disc.
Figure 6B:
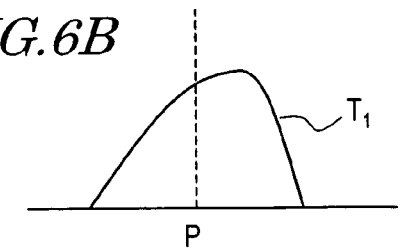
Figure 6C:
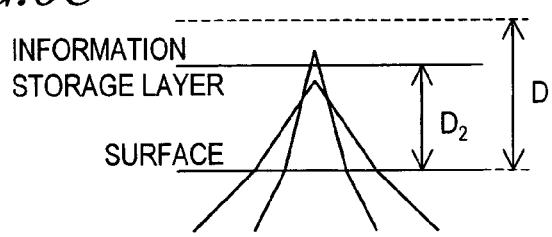
Figure 6D:
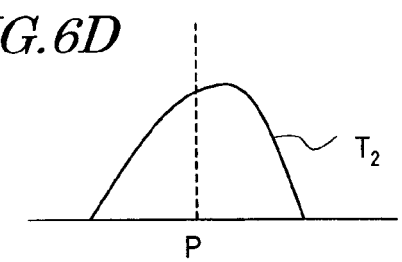
Figure 6E:
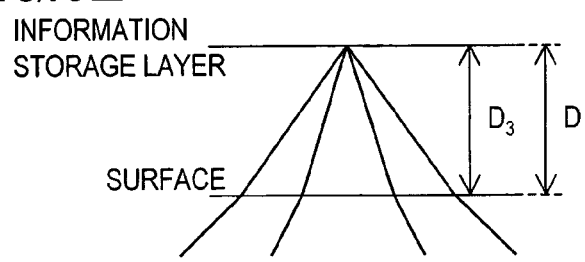
Figure 6F:
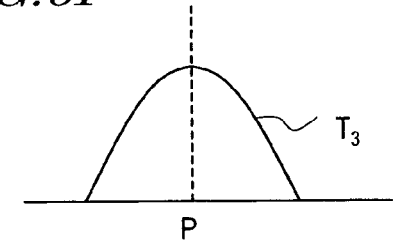
Figure 6G:
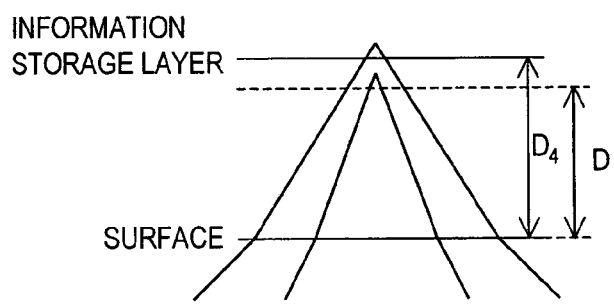

FIGS. 6A through 6J show relationships between the spherical aberration generated and the light quantity signal. First, suppose two light rays are in focus with each other on the information storage layer, which is located at a depth $D_3$ as measured from the surface of the optical disc 1, as shown in FIG. 6E, and the spherical aberration is zero (i.e., no spherical aberration has been generated). The depth $D_3$ in such a state will be referred to herein as a reference depth D. Also, suppose the aberration setter 30 fixes the level (i.e., signal voltage value) of the aberration setting signal being supplied to the aberration generator 16 (see FIG. 4) and also fixes the path of the light 110 entering the lens 13. In that case, as the focus actuator 14 is driven so as to gradually move the beam spot from a position shallower than the reference depth D to a position deeper than the reference depth D, the reflected light quantity detector 40 outputs a light quantity signal having the waveform shown in FIG. 6F.

In FIGS. 6B, 6D, 6F, 6H and 6J, the abscissa represents the time. As can be seen from FIG. 6F, this waveform is symmetric, and the beam spot is located on the information storage layer with the depth D at a time P when the light quantity signal has the maximum amplitude.

Next, suppose a situation where while the aberration setter 30 is fixing the level (i.e., signal voltage value) of the aberration setting signal, an optical disc, including an information storage layer at a depth that is different from the reference depth D, is loaded into the optical disc drive and the light beam should be focused on the information storage layer of that optical disc. FIG. 6A shows a situation where the light beam is in focus with the information storage layer that is located at a depth $D_1$ (where $D_1<D$) as measured from the surface of the optical disc. In such a situation, the beam spot of the light ray that has passed through the inside portion of the lens 13 is deeper than the information storage layer. On the other hand, the beam spot of the light ray that has passed through the outside portion of the lens 13 is shallower than the information storage layer. Since these two light rays are out of focus with each other, a spherical aberration has been generated in such a situation. If the beam spot is gradually moved from a position shallower than the depth $D_1$ to a position deeper than the depth $D_1$ as in the process described above, the reflected light quantity detector 40 outputs a light quantity signal having the waveform shown in FIG. 6B. At the time P, the beam spot is located on the information storage layer. Then, if another optical disc, including an information storage layer at a depth $D_2$ (where $D_1<D_2<D$), is loaded and if the light beam is focused on that information storage layer as shown in FIG. 6C, the light quantity signal shown in FIG. 6D is generated. The same statement applies to the relationship between the spherical aberration generated and the light quantity signal shown in FIGS. 6G and 6H or in FIGS. 6I and 6J. In the optical disc shown in FIG. 6G, the information storage layer thereof is located at a depth $D_4$ (where $D<D_4$). In the optical disc shown in FIG. 6I on the other hand, the information storage layer thereof is located at a depth $D_5$ (where $D<D_4<D_5$). In each of these two situations, the beam spot of the light ray that has passed through the inside portion of the lens 13 is shallower than the information storage layer, while the beam spot of the light ray that has passed through the outside portion of the lens 13 is deeper than the information storage layer.

Figure 6H:
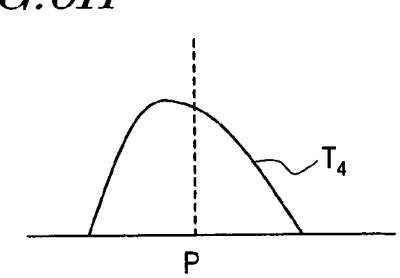
Figure 6I:
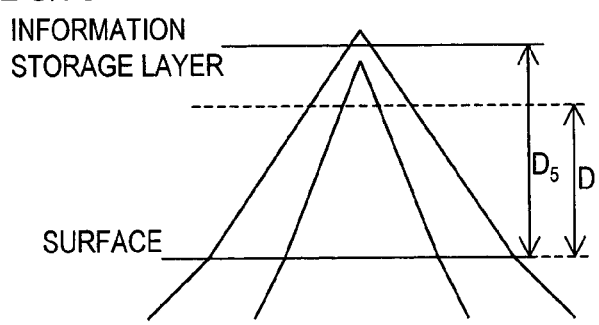
Figure 6J:
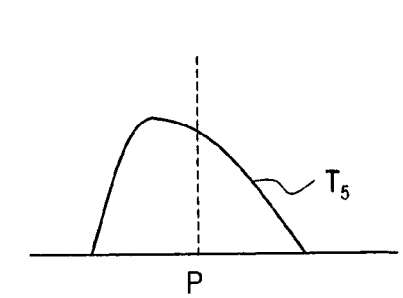

As can be seen from FIGS. 6B, 6D, 6F, 6H and 6J, if the light quantity signal has a symmetric waveform, no spherical aberration has been generated. But if the light quantity signal has an asymmetric waveform, some spherical aberration has been generated. And the asymmetric waveform of the light quantity signal means that the information storage layer is either shallower or deeper than the reference depth D. Specifically, if the information storage layer is shallower than the reference depth D (i.e., in the situation shown in FIG. 6A or 6C), then the reflected light quantity signal has the highest level when the beam spot is located deeper than the information storage layer as shown in FIG. 6B or 6D. Conversely, if the information storage layer is deeper than the reference depth D (i.e., in the situation shown in FIG. 6G or 6I), then the reflected light quantity signal has the highest level when the beam spot is located shallower than the information storage layer as shown in FIG. 6H or 6J.

These results show that if the reflected light quantity signal has the highest level before the time P, then the information storage layer of the optical disc should be deeper than the reference depth D and that if the reflected light quantity signal has the highest level after the time P, then the information storage layer of the optical disc should be shallower than the reference depth D. It is also possible to estimate, by the length of the time lag, how much the information storage layer of the optical disc is deeper or shallower than the reference depth D. The process to be described below is based on this principle. Alternatively, it is also possible to estimate how much the information storage layer is deeper or shallower than the reference depth D by calculating the difference in the waveform of the reflected light quantity signal. Specifically, in that case, the difference in the level of the reflected light quantity signal between a point in time the focus error signal has the maximum level and a point in time the focus error signal has the minimum level needs to be calculated.

The asymmetry detector 41 shown in FIG. 4 determines whether the waveform of the light quantity signal is symmetric or asymmetric, thereby outputting a symmetry indicating signal representing the degree of symmetry of the waveform of the light quantity signal. In the following preferred embodiment, the asymmetry detector 41 further evaluates the symmetry by using the focus error signal, too. Specifically, the asymmetry detector 41 calculates the difference between the output signal of the reflected light quantity detector 40 when the focus error signal with the maximum level is output from the FE generator 20 and the output signal of the reflected light quantity detector 40 when the focus error signal with the minimum level is output from the FE generator 20. Based on the magnitude of this difference, the asymmetry detector 41 evaluates the symmetry, thereby generating a symmetry indicating signal representing the polarity of the difference.

Hereinafter, it will be described with reference to FIGS. 7 through 9 how the asymmetry detector 41 operates. In the following description, the information storage layer on which the beam spot should be located will be referred to as a "target information storage layer".

FIG. 7 shows the waveforms of signals in a situation where the depth of a target information storage layer is equal to the reference depth at which the best spherical aberration can be obtained. In FIG. 7, portion (a) shows the waveform of the focus error signal, portion (b) shows the waveform of the reflected light quantity signal, and portion (c) shows the symmetry indicating signal. In FIG. 7, the abscissa represents the time and the ordinate represents the signal level. In the situation where the best spherical aberration has been generated with respect to the target information storage layer, when the focus error signal has the zero level during the period R shown in portion (a) of FIG. 7, the beam spot is located right on the target information storage layer. When the focus error signal has the zero level, the spherical aberration is also equal to zero. Thus, the reflected light quantity signal shown in portion (b) of FIG. 7 has the maximum level.

The asymmetry detector 41 detects the degree of symmetry of the reflected light quantity signal in the following manner. First, in the period R, the asymmetry detector 41 defines a time $t_1$ at which the focus error signal has the maximum level, a time $t_2$ at which the focus error signal crosses the zero level, and a time $t_3$ at which the focus error signal has the minimum level. In this case, the waveform of the focus error signal is approximately symmetric with respect to the target information storage layer. Then, the asymmetry detector 41 obtains the levels $T(t_1)$ and $T(t_3)$ of the reflected light quantity signal at the times $t_1$ and $t_3$, and calculates the difference $(T(t_1)-T(t_3))$ between these two levels. As can be seen from portion (b) of FIG. 7, since $T(t_1)=T(t_3)$ in this case, $T(t_1)-T(t_3)=0$. Consequently, the asymmetry detector 41 regards the reflected light quantity signal as symmetric with respect to the time $t_2$ and generates and outputs a symmetry indicating signal with a zero level. In the example shown in FIG. 7, the symmetry indicating signal is generated when the period R terminates. However, the present invention is in no way limited to this specific preferred embodiment. Thus, the symmetry indicating signal may also be generated after the time $t_3$ has been passed and before the period R ends.

FIG. 8 shows the waveforms of signals in a situation where the depth of a target information storage layer is deeper than the reference depth at which the best spherical aberration can be obtained. In FIG. 8, portion (a) shows the waveform of the FE signal, portion (b) shows the waveform of the reflected light quantity signal, and portion (a) shows the symmetry indicating signal. Following the above procedure, the asymmetry detector 41 also defines the times $t_1$, $t_2$ and $t_3$ and detects the degree of symmetry of the reflected light quantity signal based on the levels $T(t_1)$ and $T(t_3)$ of the reflected light quantity signal at the times $t_1$ and $t_3$. In the example shown in FIG. 8, since $T(t_1)>T(t_3)$, $T(t_1)-T(t_3)>0$. Consequently, the asymmetry detector 41 regards the reflected light quantity signal as asymmetric and generates and outputs a positive symmetry indicating signal representing the difference as shown in portion (c) of FIG. 8. For example, the symmetry indicating signal may have a value that is equal to the difference (i.e., $\{T(t_1)-T(t_3)\}$ (>0)).

In the situation where the depth of the target information storage layer is deeper than the reference depth at which the best spherical aberration can be obtained, the amplitude of the focus error signal shown in portion (a) of FIG. 8 is smaller than that of the focus error signal shown in portion (a) of FIG. 7. Also, in that case, the waveform of the reflected light quantity signal is not symmetric about the time $t_2$ at which the focus error signal crosses the zero level. Instead, the reflected light quantity signal has its maximum level when the beam spot is located at a position that is shallower than the target information storage layer.

Figure 9:
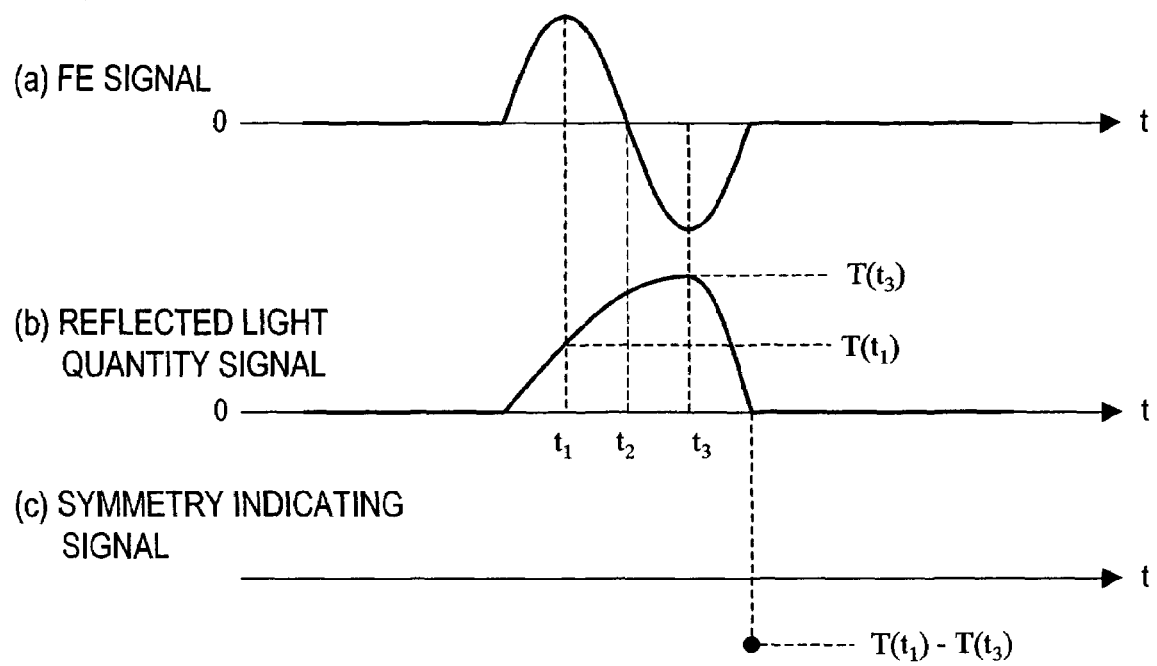
FIG. 9 shows the waveforms of signals in a situation where the depth of a target information storage layer is shallower than the reference depth at which the best spherical aberration can be obtained.

FIG. 9 shows the waveforms of signals in a situation where the depth of a target information storage layer is shallower than the reference depth at which the best spherical aberration can be obtained. In FIG. 9, portion (a) shows the waveform of the FE signal, portion (b) shows the waveform of the reflected light quantity signal, and portion (c) shows the symmetry indicating signal. Following the above procedure, the asymmetry detector 41 also defines the times $t_1$, $t_2$ and $t_3$ and detects the degree of symmetry of the reflected light quantity signal based on the levels $T(t_1)$ and $T(t_3)$ of the reflected light quantity signal at the times $t_1$ and $t_3$. In the example shown in FIG. 9, since $T(t_1)<T(t_3)$, $T(t_1)-T(t_3)<0$. Consequently, the asymmetry detector 41 regards the reflected light quantity signal as asymmetric and generates and outputs a negative symmetry indicating signal representing the difference as shown in portion (c) of FIG. 9. For example, the symmetry indicating signal may have a value that is equal to the difference (i.e., $\{T(t_1)-T(t_3)\}$ (<0)).

In the situation where the depth of the target information storage layer is shallower than the reference depth at which the best spherical aberration can be obtained, the amplitude of the focus error signal shown in portion (a) of FIG. 9 is smaller than that of the focus error signal shown in portion (a) of FIG. 7. Also, in that case, the waveform of the reflected light quantity signal is not symmetric about the time $t_2$ at which the focus error signal crosses the zero level. Instead, the reflected light quantity signal has its maximum level when the beam spot is located at a position that is deeper than the target information storage layer.

The configuration of the optical disc drive 100 will be further described with reference to FIG. 4 again. In accordance with the symmetry indicating signal supplied from the asymmetry detector 41, the disc type recognizer 42 estimates the depth of the information storage layer of the given optical disc 1 as measured from the surface thereof, and determines the type of the loaded optical disc by the depth estimated. The disc type recognizer 42 may also determine the type of the given optical disc by using the aberration setting signal supplied from the aberration setter 30 (more specifically, the location and magnitude of the spherical aberration as currently defined by the aberration setting signal).

Hereinafter, it will be described with reference to FIGS. 4 and 10 how this optical disc drive 100 operates. In the following description, the optical disc drive 100 can read and/or write information from/on multiple types of optical discs, each of which includes an information storage layer at a unique depth as measured from the surface thereof. That is to say, those optical discs include their information storage layers at mutually different depths. Thus, if the depth of the information storage layer of a given optical disc can be estimated, then the type of the optical disc can be determined. It should be noted, however, that the depth does not have to be estimated as a specific numerical value.

More specifically, a process of recognizing the given optical disc as one of two types (which will be referred to herein as "Optical Disc A" and "Optical Disc B", respectively) will be described for the sake of simplicity. In this process, the type of the given optical disc 1 is determined by judging whether or not the depth of the information storage layer of the optical disc as measured from the surface thereof is deeper than the reference depth. In the following example, the information storage layer of Optical Disc A is supposed to be shallower than that of Optical Disc B. For example, Optical Disc A may be a BD as shown in FIG. 2C and Optical Disc B may be a DVD as shown in FIG. 2B.

Figure 10:
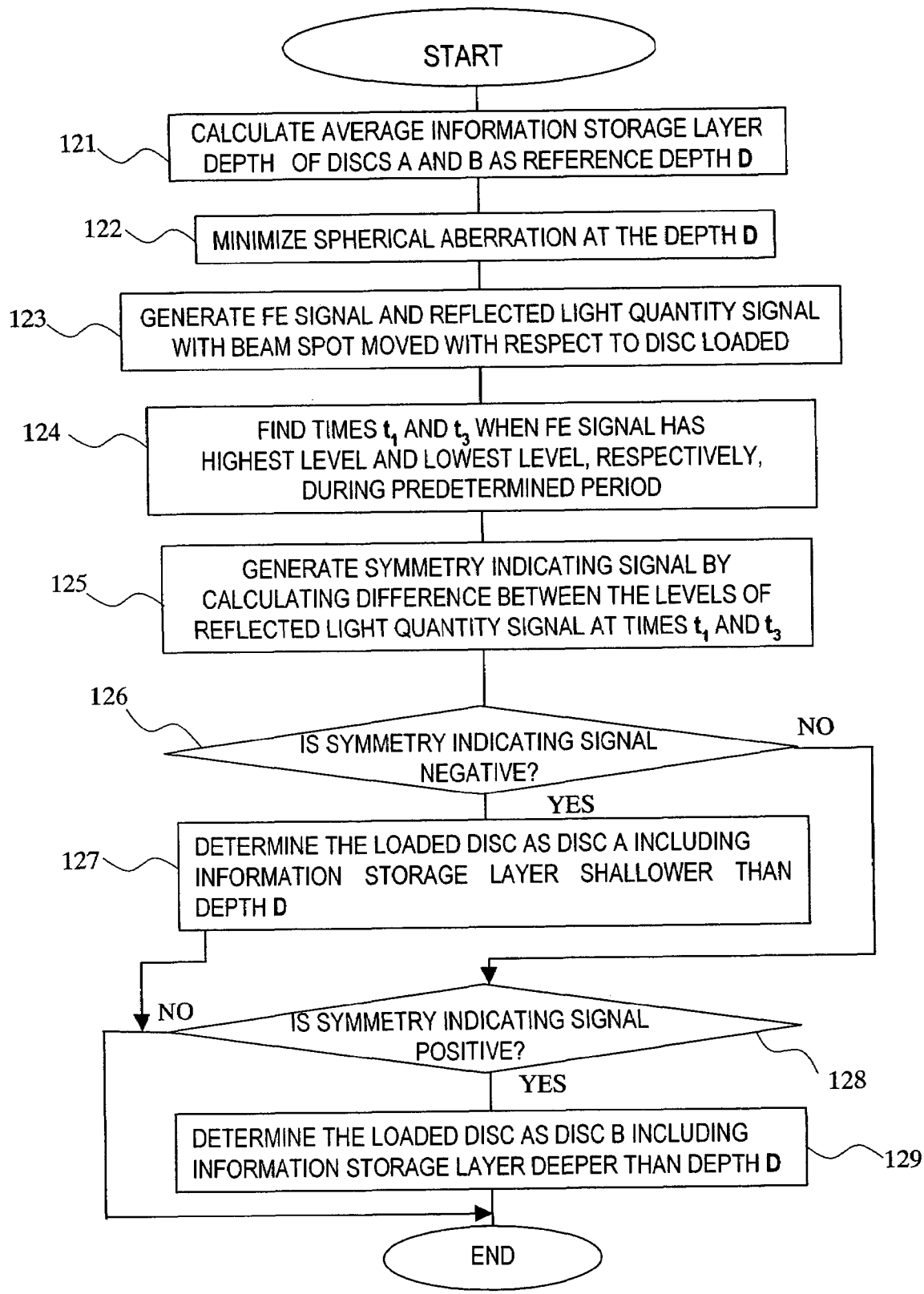
FIG. 10 is a flowchart showing how the optical disc drive 100 of the first preferred embodiment operates.

FIG. 10 is a flowchart showing how the optical disc drive 100 operates. First, in Step 121, the aberration setter 30 or a CPU (not shown) calculates the average depth of the information storage layers of Optical Discs A and B to be recognized. This average depth will be used as the reference depth D. In this case, the information storage layers of these Optical Discs A and B have their own designed depths. This reference depth D does not have to be calculated every time the optical disc drive 100 is turned ON but may be stored as a preset value.

Next, in Step 122, the aberration setter 30 outputs an aberration setting signal that minimizes the spherical aberration when the beam spot is located at the reference depth D. As used herein, the "minimized" spherical aberration means that the spherical aberration is either zero or the smallest. The aberration generator 16 operates in accordance with this aberration setting signal.

It should be noted that these processing steps 121 and 122 may be performed before the optical disc 1 to be recognized is loaded into the optical disc drive 100. That is to say, by getting predefined values stored, these processing steps 121 and 122 may be carried out as soon as the optical disc drive 100 is turned ON.

Subsequently, in Step 123, when the optical disc is loaded, the light source 11 emits a light beam and the focus drive signal generator 22 brings the beam spot of the light beam from a position that is sufficiently distant from the optical disc 1 toward the optical disc 1. In response, the FE generator 20 generates a focus error signal and the reflected light quantity detector 40 generates a reflected light quantity signal. Thereafter, in Step 124, the asymmetry detector 41 finds a time $t_1$ at which the focus error signal has the highest level during a predetermined period and a time $t_3$ at which the focus error signal has the lowest level during the predetermined period. Then, in Step 125, the asymmetry detector 41 calculates the difference between the levels of the reflected light quantity signal at the times $t_1$ and $t_3$, thereby generating a symmetry indicating signal.

Next, in Step 126, the disc type recognizer 142 determines whether or not the symmetry indicating signal is negative. If the answer is YES, then the process advances to the next step 127. Otherwise, the process skips the step 127 and jumps to step 128.

Specifically, in Step 127, the disc type recognizer 42 determines the loaded optical disc as Optical Disc A including an information storage layer at a depth that is shallower than the reference depth D. This is a situation corresponding to FIGS. 6A, 6B and 9 or FIGS. 6C, 6D and 9. Then, the process ends successfully.

On the other hand, in Step 128, the disc type recognizer 142 determines whether or not the symmetry indicating signal is positive. If the answer is YES, then the process advances to the next step 129. Otherwise, the process ends.

Finally, in Step 129, the disc type recognizer 42 determines the loaded optical disc as Optical Disc B including an information storage layer at a depth that is deeper than the reference depth D. This is a situation corresponding to FIGS. 6G, 6H and 9 or FIGS. 6I, 6J and 9. Then, the process ends successfully.

It should be noted that if the symmetry indicating signal is found to be neither positive nor negative (i.e., zero), then such a result may be regarded as an error and the same process may be carried out all over again. The process described above is carried out on the two information storage layers and the average depth of the two information storage layers is supposed to be the reference depth D. Thus, it is unthinkable that the symmetry indicating signal become zero (i.e., the depth of the information storage layer of the given optical disc equals the reference depth D).

The optical disc drive 100 may operate as described above. However, the optical disc drive 100 may also perform a similar process to recognize the given optical disc as one of three different types. In that case, the depth of the second deepest information storage layer, as also measured from the surface of the optical disc, among the three information storage layers of the three different types of optical discs may be adopted as the reference depth D. If the symmetry indicating signal is found to be neither positive nor negative but zero, then the optical disc loaded may be recognized as an optical disc including the second deepest information storage layer.

Also, if the optical disc drive 100 carries out the above process repeatedly, then the optical disc drive 100 can recognize the given optical disc as one of more than three different types. For example, suppose the optical disc drive 100 can read and/or write information from/on four different types of optical discs, which will be referred to herein as Optical Discs A, B, C and D, respectively. Also, those Optical Discs A, B, C and D are supposed to include their information storage layers at depths $d_1$, $d_2$, $d_3$ and $d_4$, respectively (where $d_1<d_2<d_3<d_4$). In that case, first, a reference depth $D_1$ is defined based on the depths $d_1$ and $d_2$ of the information storage layers of Optical Discs A and B, and the process shown in FIG. 10 is performed. If the given optical disc is recognized as Optical Disc A as a result of the recognition process, then the process ends by regarding the loaded optical disc as Optical Disc A. On the other hand, if the given optical disc is recognized as Optical Disc B, then another reference depth $D_2$ is defined based on the depths $d_2$ and $d_3$ of the information storage layers of Optical Discs B and C, and the process shown in FIG. 10 is performed all over again. If the given optical disc is still recognized as Optical Disc B as a result of the recognition process, then the process ends by regarding the loaded optical disc as Optical Disc B. On the other hand, if the given optical disc is recognized as Optical Disc C, then still another reference depth $D_3$ is defined based on the depths $d_3$ and $d_4$ of the information storage layers of Optical Discs C and D, and the process shown in FIG. 10 is performed all over again. As a result of the recognition process, the loaded optical disc is judged as Optical Disc C or D. By performing these processes, it is possible to recognize the loaded optical disc as one of Optical Discs A, B, C and D.

In the preferred embodiment described above, the wavelength of the laser beam emitted from the light source 11 is not particularly limited. However, the shorter the wavelength of the laser beam, the higher the responsivity to various signals. For example, if the optical disc drive 100 can read CDs, DVD-ROMs, and BDs, then the above process is preferably carried out with a laser beam for use to read BDs (with a wavelength of about 405 nm) rather than a laser beam for use to read CDs (with a wavelength of about 750 nm) to achieve higher responsivity.

In the preferred embodiment described above, to detect the degree of asymmetry of the reflected light quantity signal of the reflected light quantity detector 40, the difference between the level of the reflected light quantity signal when the focus error signal, supplied from the FE generator 20, has the highest level and that of the reflected light quantity signal when the focus error signal has the lowest level is calculated. However, this method is just an illustrative one. Alternatively, the degree of asymmetry of the reflected light quantity signal may also be detected by using the level of the focus error signal when the output signal of the reflected light quantity detector 40 has the highest level.

Also, in the preferred embodiment described above, the spherical aberration is defined to be minimized when the beam spot of the light beam is located at the average depth of the information storage layers of two or more optical discs to be recognized. However, the spherical aberration may also be defined in any other way unless the focus error signal and the reflected light quantity signal deteriorate too significantly to detect.

Furthermore, in the preferred embodiment described above, the symmetry indicating signal, output from the asymmetry detector 41, is used to recognize the type of the given optical disc 1. Alternatively, in order to find the number of information storage layers included in the given optical disc 1, the symmetry indicating signal may also be used to determine whether or not the information storage layers of the optical disc 1 fall within a predetermined range.

Embodiment 2

Hereinafter, an optical disc drive according to a second specific preferred embodiment of the present invention will be described. The optical disc drive of this second preferred embodiment processes an optical disc including multiple information storage layers. Specifically, the optical disc drive calculates the depth of a desired one of the information storage layers and performs a focus control on the desired information storage layer based on the depth obtained.

Figure 11:
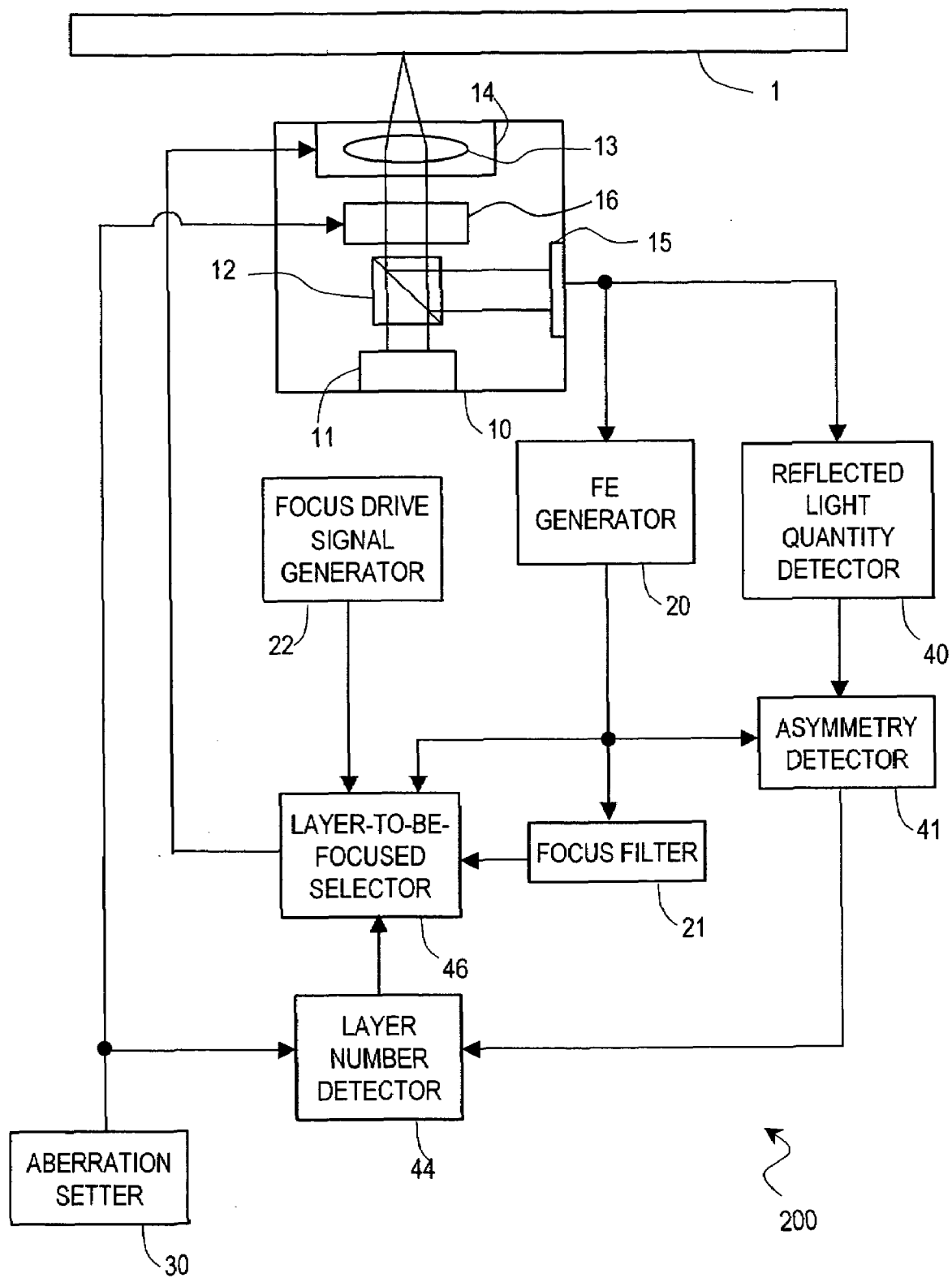
FIG. 11 shows an arrangement of functional blocks for an optical disc drive 200 according to a second specific preferred embodiment of the present invention.

FIG. 11 shows an arrangement of functional blocks for an optical disc drive 200 according to the second preferred embodiment. The optical disc drive 200 of the second preferred embodiment includes a focus filter 21, the asymmetry detector 41 and a layer-to-be-focused selector 46 in place of the disc type recognizer 42 of the optical disc drive 100 of the first preferred embodiment shown in FIG. 4. Thus, the following description of the second preferred embodiment will be focused on this difference. As for the functions and operations of the other components, the optical disc drive 200 shown in FIG. 11 is substantially the same as the optical disc drive 100 shown in FIG. 4. So each component of the optical disc drive 200, having substantially the same function as the counterpart of the optical disc drive 100, will be identified by the same reference numeral and the description thereof will be omitted herein. Also, the optical disc 1 to be loaded into the optical disc drive 200 includes multiple information storage layers as shown in FIG. 3, for example. The optical disc drive 200 pre-stores information about the numbers and depths of information storage layers in optical discs 1 to be loaded.

When one of the information storage layers of the optical disc to read information from and/or write information on (which will be referred to herein as a "desired information storage layer") is specified, the optical disc drive 200 performs a focus control on the desired information storage layer. The desired information storage layer may be specified by a CPU (not shown) that has located the information requested by the user. As a result, the optical disc drive 200 gets ready to read and/or write information from/on the desired information storage layer. In this case, the desired information storage layer does not have to be the shallowest or deepest information storage layer of the optical disc 1 but may also be one of the intermediate information storage layers between the shallowest and deepest layers.

First, the focus error signal, generated by the FE generator 20, is supplied to the focus filter 21, asymmetry detector 41 and layer-to-be-focused selector 46. The symmetry indicating signal is output from the asymmetry detector 41 to a layer number detector 44.

In accordance with the symmetry indicating signal and aberration setting signal supplied from the asymmetry detector 41 and aberration setter 30, respectively, the layer number detector 44 finds the layer number of the information storage layer on which the beam spot of the light beam is currently located. In this case, the information storage layers of the optical disc 1 are numbered in an ascending order from the surface of the optical disc 1. Hereinafter, a specific example will be described on an optical disc 1 including three information storage layers. First, the spherical aberration is defined so as to be minimized on the intermediate (i.e., second) information storage layer and the beam spot is continuously moved perpendicularly (i.e., in the depth direction) from the surface of the optical disc 1 including the three information storage layers. Then, the focus error signals will have the waveforms shown in portions (a) of FIGS. 9, 7 and 8 in this order. As already described for the optical disc drive 100 of the first preferred embodiment, the symmetry indicating signal, output from the asymmetry detector 41, has one discrete value in the predetermined period R shown in portion (a) of FIG. 7, for example. Thus, when the focus error signals have the waveforms shown in portions (a) of FIGS. 9, 7 and 8, the symmetry indicating signals shown in portions (c) of FIGS. 9, 7 and 8 are obtained.

The discrete value of the resultant symmetry indicating signal is associated with the depth of the information storage layer. Thus, according to the discrete value of the symmetry indicating signal, the layer number detector 44 can find on which information storage layer the beam spot of the light beam is currently located. More specifically, if the symmetry indicating signal has a negative discrete value, then the layer number detector 44 judges that the beam spot of the light beam is now located on the first information storage layer that is closest to the surface of the optical disc 1. On the other hand, if the symmetry indicating signal is zero, then the layer number detector 44 judges that the beam spot of the light beam is now located on the second information storage layer. And if the symmetry indicating signal has a positive discrete value, then the layer number detector 44 judges that the beam spot of the light beam is now located on the third information storage layer that is most distant from the surface of the optical disc 1. In any case, the layer number detector 44 outputs a number indicating signal including information about the layer number of the information storage layer in question (which will be referred to herein as "layer number information").

In response to the number indicating signal and the focus error signal, the layer-to-be-focused selector 46 selectively passes either the output signal of the focus filter 21 or the output signal of the focus drive signal generator 22. The selectively output signal is supplied as a drive signal to the focus actuator 14. In accordance with the drive signal, the focus actuator 14 moves the beam spot of the light beam. Thereafter, when the number indicating signal indicates the desired layer number and when the focus error signal crosses the zero level, the layer-to-be-focused selector 46 switches the signals to be selectively output. For example, for a while after the optical disc drive 200 has started to operate, the layer-to-be-focused selector 46 may select the output signal of the focus drive signal generator 22 to get a normal focusing operation performed. Thereafter, when the number indicating signal indicates the desired layer number and when the focus error signal crosses the zero level, the layer-to-be-focused selector 46 may selectively pass the output signal of the focus filter 21.

Hereinafter, it will be described exactly how this optical disc drive 200 operates. In this preferred embodiment, first, the average depth of the information storage layers of the given optical disc, as measured from the surface thereof, is calculated. This average depth will be used as the reference depth D. The aberration setter 30 generates an aberration setting signal such that the best spherical aberration is generated when the beam spot is located at the reference depth D. In this case, the depth of the intermediate information storage layer as measured from the surface of the optical disc is regarded as the reference depth D and the spherical aberration is defined so as to be minimized at the reference depth D. The aberration generator 16 operates in accordance with the aberration setting signal supplied from the aberration setter 30. It should be noted that the reference depth D may be calculated in advance and stored as a preset value because the depths of the respective information storage layers of the optical disc as measured from the surface thereof are known in advance as designed values.

For a while after having started to operate, the optical disc drive 200 keeps the focus control OFF. In the meantime, the layer-to-be-focused selector 46 selectively passes the drive signal from the focus drive signal generator 22 to the focus actuator 14. In response to the drive signal, the focus actuator 14 brings the beam spot of the light beam from a position that is sufficiently distant from the optical disc 1 toward the optical disc 1.

If the beam spot of the light beam is continuously moved in the focusing direction, then the beam spot will soon pass the first information storage layer of the optical disc 1. Then, the FE generator 20 will generate a focus error signal having the waveform shown in portion (a) of FIG. 9, for example. Also, when the beam spot of the light beam passes the information storage layer, the focus error signal will cross the zero level at the time $t_2$ shown in portion (a) of FIG. 9. Thereafter, when the beam spot further goes deep to pass the second, and the third, information storage layers one after another, the focus error signals shown in portions (a) of FIGS. 7 and 8 will be generated. On the other hand, while the beam spot is moved in this manner, the waveform of the reflected light quantity signal, output from the reflected light quantity detector 40, will change as shown in portions (b) of FIGS. 9, 7 and 8. These waveforms of the reflected light quantity signal are different from each other because the reflected light quantity signal is affected by the spherical aberration according to the difference between the depth of the information storage layer and the reference depth D as in the first preferred embodiment described above.

The asymmetry detector 41 detects the degree of asymmetry of the output signal of the reflected light quantity detector 40 by the level of the focus error signal supplied from the FE generator 20 when the reflected light quantity signal has the highest level. In accordance with the information about the degree of asymmetry provided from the asymmetry detector 41 and the magnitude of spherical aberration as defined by the aberration setter 30 for the aberration generator 16, the layer number detector 44 estimates the depth of the information storage layer. That is to say, the layer number detector 44 determines whether or not the depth of the given information storage layer is deeper than the reference depth D. Then, based on the depth estimated, the layer number detector 44 judges on which information storage layer of the optical disc 1 the beam spot of the light beam is currently located. Thereafter, when the layer number detector 44 outputs the desired layer number and when the output signal of the FE generator 20 crosses the zero level, the layer-to-be-focused selector 46 switches the signals to be selectively output and starts passing the output signal of the focus filter 21 to the focus actuator 14. In this manner, the beam spot of the light beam is controlled with respect to the desired information storage layer of the optical disc 1.

As described above, by estimating the depth of the information storage layer on which the beam spot of the light beam is currently located and by finding how the output signal of the reflected light quantity detector 40 changes its degree of symmetry with the spherical aberration, the given information storage layer can be located. And based on the current location of the beam spot detected, a focus control can be started on the desired information storage layer of the optical disc 1. In particular, even if a jump operation needs to be carried out toward a non-adjacent information storage layer, the jump operation is started after the destination information storage layer has been specified. Thus, the target information storage layer can be reached in a short time by performing the jump operation just once.

In the preferred embodiment described above, the degree of asymmetry of the reflected light quantity signal, output from the reflected light quantity detector 40, is detected by the level of the focus error signal when the output signal of the reflected light quantity detector 40 has the highest level. However, this method is just an illustrative one. Alternatively, the degree of asymmetry of the reflected light quantity signal may also be detected based on the difference between the level of the reflected light quantity signal when the focus error signal, supplied from the FE generator 20, has the highest level and that of the reflected light quantity signal when the focus error signal has the lowest level as in the first preferred embodiment described above. Also, in the preferred embodiment described above, the spherical aberration is defined to be minimized when the beam spot of the light beam is located at the average depth of the information storage layers of the given optical disc. However, the spherical aberration may also be defined in any other way unless the focus error signal and the reflected light quantity signal deteriorate too significantly to detect.

In the preferred embodiment described above, the focus control on the desired information storage layer is started in response to the number indicating signal supplied from the layer number detector 44. Alternatively, the number indicating signal may also be used to obtain information about the amplitude of the output signal of the FE generator 20 for each information storage layer of the optical disc 1 or to start a jump operation toward another information storage layer while the focus control is ON.

Embodiment 3

Hereinafter, an optical disc drive according to a third specific preferred embodiment of the present invention will be described. The optical disc drive of this preferred embodiment generates the best spherical aberration when the beam spot of the light beam is located on the information storage layer of a given optical disc without performing any focus control.

FIG. 12 shows an arrangement of functional blocks for an optical disc drive 300 according to the third preferred embodiment. The optical disc drive 300 of the third preferred embodiment includes an aberration regulator 31 in place of the disc type recognizer 42 of the optical disc drive 100 according to the first preferred embodiment shown in FIG. 4. Thus, the following description of the third preferred embodiment will be focused on this difference. As for the functions and operations of the other components, the optical disc drive 300 shown in FIG. 12 is substantially the same as the optical disc drive 100 shown in FIG. 4. So each component of the optical disc drive 300, having substantially the same function as the counterpart of the optical disc drive 100, will be identified by the same reference numeral and the description thereof will be omitted herein.

The aberration regulator 31 receives the symmetry indicating signal from the asymmetry detector 41. In response, the aberration regulator 31 sends a setting signal with a stepwise waveform to the aberration setter 30, thereby changing the magnitude of spherical aberration generated. While holding the signal supplied from the asymmetry detector 41, the aberration regulator 31 sends a high-level signal to the focus drive signal generator 23 or focus driver 23. Thereafter, the aberration regulator 31 finds the magnitude of spherical aberration to be generated when the symmetry indicating signal, supplied from the asymmetry detector 41, shows that the waveform of the reflected light quantity signal is symmetric. Then, the aberration regulator 31 outputs a setting signal to the aberration setter 30 so as to generate that spherical aberration. In addition, the aberration regulator 31 also outputs a low-level signal to the focus drive signal generator 23.

Hereinafter, it will be described with reference to FIGS. 12 and 13 how the optical disc drive 300 regulates the spherical aberration. Specifically, portion (a) of FIG. 13 shows the output signal of the focus drive signal generator 23, portion (b) of FIG. 13 shows the setting signal supplied from the aberration regulator 31 to the aberration setter 30, and portion (c) of FIG. 13 shows the symmetry indicating signal supplied from the asymmetry detector 41. In FIG. 13, the abscissa represents the time.

Until the time $t_1$, the aberration regulator 31 outputs a continuous step signal having a predetermined period to the aberration setter 30 as shown in portion (b) of FIG. 13. Synchronously with the step signal, the focus drive signal generator 23 drives the focus actuator 14 such that the beam spot of the light beam goes back and forth in the focusing direction through the information storage layer of the optical disc 1 as shown in portion (a) of FIG. 13. As a result, the beam spot of the light beam repeatedly passes the information storage layer in the focusing direction. In this case, one period in which the beam spot of the light beam reciprocates in the focusing direction around the information storage layer of the optical disc 1 is equal to one period in which the step signal supplied from the aberration regulator 31 to the aberration setter 30 changes. When the output signal of the aberration regulator 31 becomes low, the focus drive signal generator 23 will stop driving the focus actuator 14.

Every time the beam spot of the light beam passes each information storage layer of the optical disc 1, the focus error signal, output from the FE generator 20, shows one of the three waveforms shown in portions (a) of FIGS. 7, 8 and 9. In response, the light quantity signal, output from the reflected light quantity detector 40, shows one of the three waveforms shown in portions (b) of FIGS. 7, 8 and 9. That is to say, as the focus actuator 14 is driven in the focusing direction, the output signal of the reflected light quantity detector 40 changes its degree of symmetry according to the difference between the depth of the information storage layer of the optical disc 1 as measured from the surface thereof and the reference depth at which no spherical aberration is generated. Specifically, if the depth of the information storage layer is shallower than the reference depth D, then the waveforms shown in portions (a) and (b) of FIG. 9 are obtained. On the other hand, if the depth of the information storage layer is deeper than the reference depth D, then the waveforms shown in portions (a) and (b) of FIG. 8 are obtained.

The asymmetry detector 41 detects the degree of asymmetry of the output signal of the reflected light quantity detector 40 by the level of the focus error signal supplied from the FE generator 20 when the reflected light quantity signal has the highest level. As shown in portion (o) of FIG. 13, every time the focus drive signal generator 23 completes its reciprocation, the asymmetry detector 41 sends a signal to the aberration regulator 31. Whenever the symmetry indicating signal supplied from the asymmetry detector 41 has the minimum absolute value, the aberration regulator 31 updates the level of the setting signal to be supplied to the aberration setter 30. In this preferred embodiment, the level of the setting signal for the aberration setter 30 when the symmetry indicating signal becomes zero is stored as the minimum value. From the time $t_1$ on, the aberration regulator 31 sends the setting signal having the minimum value stored to the aberration setter 30. Thus, the best spherical aberration can be generated on the information storage layer.

In this manner, by detecting the variation in the degree of symmetry of the output signal of the reflected light quantity detector 40 according to the depth of the information storage layer on which the beam spot of the light beam is located and the spherical aberration generated by the aberration generator 16, the spherical aberration at the beam spot of the light beam can be optimized with respect to the information storage layer of the optical disc 1 without performing any focus control.

In the preferred embodiment described above, the degree of asymmetry of the reflected light quantity signal, output from the reflected light quantity detector 40, is detected by the level of the focus error signal when the output signal of the reflected light quantity detector 40 has the highest level. However, this method is just an illustrative one. Alternatively, the degree of asymmetry of the reflected light quantity signal may also be detected based on the difference between the level of the reflected light quantity signal when the focus error signal, supplied from the FE generator 20, has the highest level and that of the reflected light quantity signal when the focus error signal has the lowest level as in the first preferred embodiment described above. Also, in the preferred embodiment described above, the spherical aberration is defined to be minimized when the beam spot of the light beam is located at the average depth of the information storage layers of the given optical disc. However, the spherical aberration may also be defined in any other way unless the focus error signal and the reflected light quantity signal deteriorate too significantly to detect.

Each of optical disc drives according to various preferred embodiments of the present invention described above performs its operation in accordance with a computer program. The computer program is executed by a CPU (not shown) that controls the overall operation of the optical disc drive. The computer program may be stored on an optical storage medium such as an optical disc, a semiconductor storage medium such as an SD memory card or an EEPROM, or a magnetic recording medium such as a flexible disk. Also, the computer program may be not just installed in the optical disc drive by way of such a storage medium but also downloaded thereto through telecommunications lines (e.g., via the Internet). A digital signal processor (DSP) in which such a computer program is installed and which issues operating instructions in accordance with the computer program may replace all functional blocks of the optical disc drive, except for its physically indispensable components such as the light source 11, lens 13 and photodetector 15. Thus, the functions of the aberration setter 30, asymmetry detector 41, disc type recognizer 42, layer-to-be-focused selector 46, layer number detector 44 and aberration regulator 31 are implementable by a DSP.

According to various preferred embodiments of the present invention described above, the depth of the information storage layer of a loaded optical disc as measured from the surface thereof is estimated according to a degree of symmetry of the waveform of a light quantity signal representing the quantity of light that has been reflected from the optical disc, and the type of the loaded optical disc is recognized by the depth estimated. Thus, the type of the given optical disc can be determined without depending on the sensitivity of circuits in an optical disc drive.

Also, according to preferred embodiments of the present invention, the information storage layers of a loaded optical disc are numbered in an ascending order from the surface thereof and the layer number of a given information storage layer is detected according to the waveform of the light quantity signal representing the quantity of light that has been reflected from the optical disc. Thus, the information storage layer on which the light beam is currently focused can be located without being affected by variations in the sensitivity of circuits in an optical disc drive. As a result, the light beam can be focused on any desired one of the multiple information storage layers of the loaded optical disc. Particularly, even when the optical disc loaded has multiple information storage layers, any of those information storage layers can be located no matter where the information storage layer in question is. That is to say, not just the information storage layer closest to the surface of the optical disc and the information storage layer farthest from that surface but also any other information storage layer can be located as well. If the amplitude or the symmetry of the focus error signal changes from one information storage layer to another, then the amplitude or symmetry can be measured on each and every information storage layer separately. Also, even if an optical disc drive emits a light beam with so short a focal depth that the objective lens thereof easily contacts with a loaded optical disc at the beginning of a focus control process, the optical disc drive may also start the focus control process on an arbitrary information storage layer in a short time. Furthermore, the symmetry of the waveform of a light quantity signal can be detected in accordance with the direction in which the sum signal is disturbed. Thus, it is possible to see if the given optical disc meets predetermined specifications as defined by physical standards (e.g., the lower and upper limits of the depth of the information storage layer).

Furthermore, according to preferred embodiments of the present invention, if the light quantity signal, representing the quantity of light that has been reflected from the optical disc, has a symmetric waveform, a control signal that will define such symmetry is output to a spherical aberration generator, thus regulating the best spherical aberration to a desired value. In this manner, the best spherical aberration can be defined for the desired information storage layer without newly generating any additional detection signal to detect the spherical aberration or without performing any focus control. Also, a symmetry detector detects the degree of symmetry of the waveform of the light quantity signal by comparing the level of the light quantity signal at a point in time when the focus signal has the highest level with the level of the light quantity signal at a point in time when the focus signal has the lowest level. Accordingly, even if the sum signal has little variation in the vicinity of the beam spot, the disturbance of the sum signal can also be detected precisely. Or even if the focus signal hardly changes around the highest or lowest level thereof, the disturbance of the sum signal can also be detected precisely.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical disc drive for reading and/or writing information from/on multiple types of optical discs, of which information storage layers have mutually different depths as measured from surfaces thereof, the optical disc drive comprising:
    a light source for emitting light;
    a lens for converging the light to form a beam spot;
    a photodetector for detecting the light that has been reflected from an information storage layer and outputting reflected light signals;
    a spherical aberration generator for generating a minimum spherical aberration when the beam spot is located at a reference depth that is defined by the depths of the information storage layers of the multiple types of optical discs;
    a focus driver for moving the beam spot perpendicularly to the information storage layer of an loaded optical disc, which has been loaded into the optical disc drive, by controlling position of the lens;
    a light quantity detector for generating a light quantity signal, representing the quantity of reflected light, on receiving and obtaining the sum of the reflected light signals from the photodetector every time the beam spot is moved; and
    a type recognizer for recognizing a type of the loaded optical disc by estimating a depth of the information storage layer of the loaded optical disc from a surface thereof according to a degree of symmetry of a waveform of the light quantity signal.

2. The optical disc drive according to claim 1, further comprising a symmetry detector for outputting a symmetry indicating signal, representing the degree of symmetry of the waveform of the light quantity signal, by determining whether the waveform of the light quantity signal is symmetric or asymmetric in a predetermined period, and
    wherein the type recognizer recognizes the type of the loaded optical disc in accordance with the symmetry indicating signal.

3. The optical disc drive according to claim 2, further comprising a focus signal generator for generating a focus signal representing a positional relationship between the beam spot and the information storage layer,
    wherein the symmetry detector finds a first time, at which the focus signal has the highest level during the predetermined period, and a second time, at which the focus signal has the lowest level during the predetermined period, and determines, by first and second levels of the light quantity signal at the first and second times, respectively, whether the waveform of the light quantity signal is symmetric or asymmetric.

4. The optical disc drive according to claim 3, wherein the symmetry detector regards the waveform of the light quantity signal as symmetric if the difference between the first and second levels of the light quantity signal at the first and second times is equal to zero, and as asymmetric if the difference is not equal to zero.

5. The optical disc drive according to claim 4, wherein the symmetry indicating signal generated by the symmetry detector represents that the difference is zero, positive or negative, and
    wherein the type recognizer determines, according to the symmetry indicating signal, whether the depth of the information storage layer of the loaded optical disc from the surface thereof is greater or smaller than the reference depth.

6. The optical disc drive according to claim 1, wherein the reference depth falls within a range that is defined by a depth of the information storage layer of a first type of disc and a depth of the information storage layer of a second type of disc, the first and the second types of discs belonging to the multiple types of optical discs.

7. The optical disc drive according to claim 1, wherein the type recognizer determines the number of information storage layers of the loaded optical disc according to the waveform of the light quantity signal.

8. The optical disc drive according to claim 1, further comprising an aberration setter for generating an aberration setting signal that defines how much spherical aberration should be generated,
    wherein the spherical aberration generator generates the spherical aberration in accordance with the aberration setting signal, and wherein the type recognizer also estimates the depth of the information storage layer of the loaded optical disc from the surface thereof in accordance with the aberration setting signal.

9. An optical disc drive for reading and/or writing information from/on an optical disc including multiple information storage layers that have mutually different depths as measured from a surface thereof, the optical disc drive comprising:
- a light source for emitting light;
- a lens for converging the light to form a beam spot;
- a photodetector for detecting the light that has been reflected from the information storage layers and outputting a reflected light signals;
- a spherical aberration generator for generating a minimum spherical aberration when the beam spot is located at a reference depth that is defined by the depths of the information storage layers of the optical disc;
- a focus driver for moving the beam spot perpendicularly to the information storage layers by controlling the position of the lens;
- a light quantity detector for generating a light quantity signal, representing the quantity of the reflected light, on receiving and obtaining the sum of the reflected light signals from the photodetector every time the beam spot is moved; and
- a layer number finder for finding a layer number of the information storage layer, on which the beam spot should be located, by the waveform of the light quantity signal, the information storage layers being numbered in an ascending order from the surface of the optical disc.

10. The optical disc drive according to claim 9, further comprising:
- a selector for selecting one of the information storage layers by the layer number that has been found by the layer number finder and moving the beam spot toward the vicinity of the selected information storage layer by driving the focus driver; and
- a focus signal generator for generating a focus signal representing a positional relationship between the beam spot and the selected information storage layer.

11. The optical disc drive according to claim 10, wherein the selected information storage layer is changeable in accordance with an instruction of the selector.

12. The optical disc drive according to claim 9, further comprising a symmetry detector for outputting a symmetry indicating signal, representing the degree of symmetry of the waveform of the light quantity signal, by determining whether the waveform of the light quantity signal is symmetric or asymmetric in a predetermined period, and
wherein the layer number finder finds the layer number of the selected information storage layer of the optical disc in accordance with the symmetry indicating signal.

13. The optical disc drive according to claim 12, wherein the symmetry detector finds a first time, at which the focus signal has the highest level during the predetermined period, and a second time, at which the focus signal has the lowest level during the predetermined period, and determines, by first and second levels of the light quantity signal at the first and second times, respectively, whether the waveform of the light quantity signal is symmetric or asymmetric.

14. An optical disc drive for reading and/or writing information from/on an optical disc that includes an information storage layer, the optical disc drive comprising:
- a light source for emitting light;
- a lens for converging the light to form a beam spot;
- a photodetector for detecting the light that has been reflected from the information storage layer and outputting a reflected light signals;
- a spherical aberration generator for generating a spherical aberration in response to a control signal;
- a focus driver for moving the beam spot back and forth between one side and the other side of the information storage layer and perpendicularly to the information storage layer by controlling the position of the lens;
- a light quantity detector for generating a light quantity signal, representing the quantity of the reflected light, on receiving and obtaining the sum of the reflected light signals from the photodetector every time the beam spot is moved;
- a symmetry detector for outputting a symmetry indicating signal, representing the degree of symmetry of the waveform of the light quantity signal, by determining whether the waveform of the light quantity signal is symmetric or asymmetric; and
- an aberration regulator for generating and outputting the control signal to the spherical aberration generator in accordance with the symmetry indicating signal, the aberration regulator identifying the symmetry indicating signal, representing that the waveform of the light quantity signal is symmetric, and generating the control signal associated with the identified symmetry indicating signal.

15. The optical disc drive according to claim 14, further comprising a focus signal generator for generating a focus signal representing a positional relationship between the beam spot and the information storage layer,
wherein the symmetry detector finds a first time, at which the focus signal has the highest level during a predetermined period, and a second time, at which the focus signal has the lowest level during the predetermined period, and determines, by first and second levels of the light quantity signal at the first and second times, respectively, whether the waveform of the light quantity signal is symmetric or asymmetric during the predetermined period.

16. The optical disc drive according to claim 14, further comprising a focus signal generator for generating a focus signal representing a positional relationship between the beam spot and the information storage layer,
wherein the symmetry detector finds a first time, at which the light quantity signal has the highest level during a predetermined period, and a second time, at which the light quantity signal has the lowest level during the predetermined period, and determines, by first and second levels of the focus signal at the first and second times, respectively, whether the waveform of the light quantity signal is symmetric or asymmetric.

17. A method for recognizing a type of a optical disc, which has been loaded into the optical disc drive, as one of multiple types of optical discs, of which information storage layers have mutually different depths as measured from surfaces thereof, the method comprising steps of:
- emitting light;
- converging the light to form a beam spot by a lens;
- detecting the light that has been reflected from an information storage layer to generate reflected light signals;
- generating a minimum spherical aberration when the beam spot is located at a reference depth that is defined by depths of the information storage layers of the multiple types of the optical discs;

moving the beam spot perpendicularly to the information storage layer of the loaded optical disc by controlling position of the lens;

generating a light quantity signal, representing quantity of a reflected light, on receiving and obtaining the sum of the reflected light signals every time the beam spot is moved; and recognizing a type of the loaded optical disc by estimating the depth of the information storage layer of the optical disc from the surface thereof according to a degree of symmetry of the waveform of the light quantity signal.

18. A method for finding a beam spot of light on one of multiple information storage layers of an optical disc, the information storage layers having mutually different depths as measured from a surface of the optical disc, the method comprising steps of:

emitting light; P1 getting the light converged, and a beam spot formed, by a lens;

detecting the light that has been reflected from the information storage layer to generate reflected light signals;

minimizing the spherical aberration of the lens when the beam spot is located at a reference depth that is defined by the depths of the information storage layers of the optical disc;

moving the beam spot perpendicularly to the information storage layers by controlling the position of the lens;

generating a light quantity signal, representing the quantity of the reflected light, on receiving and obtaining the sum of the reflected light signals every time the beam spot is moved; and finding the layer number of the information storage layer, on which the beam spot should be located, by the waveform of the light quantity signal, the information storage layers being numbered in an ascending order from the surface of the optical disc.

19. A method for regulating a spherical aberration with respect to an information storage layer of an optical disc, the method comprising steps of:

emitting light;

getting the light converged, and a beam spot formed, by a lens; detecting the light that has been reflected from the information storage layer to generate reflected light signals;

moving the beam spot back and forth between one side and the other side of the information storage layer and perpendicularly to the information storage layer by controlling the position of the lens;

generating a light quantity signal, representing the quantity of the reflected light, on receiving and obtaining the sum of the reflected light signals every time the beam spot is moved;

outputting a symmetry indicating signal, representing the degree of symmetry of the waveform of the light quantity signal, by determining whether the waveform of the light quantity signal is symmetric or asymmetric;

identifying the symmetry indicating signal, representing that the waveform of the light quantity signal is symmetric, and generating a control signal associated with the symmetry indicating signal identified; and generating the spherical aberration in accordance with the control signal.

* * * * *

UNITED STATES PATENT AND TRADEMARK OFFICE
CERTIFICATE OF CORRECTION

PATENT NO. : 7,190,650 B2 Page 1 of 1
APPLICATION NO. : 10/648018
DATED : March 13, 2007
INVENTOR(S) : Kenji Fujiune et al.

It is certified that error appears in the above-identified patent and that said Letters Patent is hereby corrected as shown below:

<u>Column 31</u>

Line 17, delete "P1";
Line 17, insert new paragraph before "getting the light".

Signed and Sealed this

Fourth Day of September, 2007

JON W. DUDAS
*Director of the United States Patent and Trademark Office*